(12) United States Patent
Onishi

(10) Patent No.: US 10,811,894 B2
(45) Date of Patent: Oct. 20, 2020

(54) CONTROL DEVICE, ELECTRONIC APPARATUS, AND CONTACTLESS POWER TRANSMISSION SYSTEM

(71) Applicant: SEIKO EPSON CORPORATION, Tokyo (JP)

(72) Inventor: Kota Onishi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 141 days.

(21) Appl. No.: 15/149,449

(22) Filed: May 9, 2016

(65) Prior Publication Data

US 2016/0336774 A1 Nov. 17, 2016

(30) Foreign Application Priority Data

May 13, 2015 (JP) .................................. 2015-098045

(51) Int. Cl.
| | |
|---|---|
| *H02J 7/00* | (2006.01) |
| *H02J 7/02* | (2016.01) |
| *H04B 1/3827* | (2015.01) |
| *H02J 50/12* | (2016.01) |
| *H02J 50/80* | (2016.01) |

(52) U.S. Cl.
CPC .............. *H02J 7/025* (2013.01); *H02J 50/12* (2016.02); *H02J 50/80* (2016.02); *H02J 7/00034* (2020.01)

(58) Field of Classification Search
CPC .......... H02J 7/0029; H02J 7/025; H02J 7/007; H02J 2007/0096; H02J 50/80; H02J 50/12; H04B 1/3833

USPC ......................................................... 320/108
See application file for complete search history.

(56) References Cited

U.S. PATENT DOCUMENTS

| | | | | |
|---|---|---|---|---|
| 6,522,104 | B1 * | 2/2003 | Drori .................... | H02J 7/0031 320/149 |
| 7,605,579 | B2 * | 10/2009 | Betser ................... | H02M 3/073 324/76.11 |
| 8,026,694 | B2 | 9/2011 | Kamijo et al. | |
| 8,054,036 | B2 | 11/2011 | Onishi et al. | |
| 8,174,330 | B2 * | 5/2012 | McCarthy .......... | G01R 19/2506 331/158 |
| 2005/0017686 | A1 | 1/2005 | Sakakibara et al. | |
| 2007/0098047 | A1 * | 5/2007 | Iida ........................ | H04B 15/02 375/141 |
| 2007/0182373 | A1 | 8/2007 | Sakakibara et al. | |
| 2008/0211455 | A1 * | 9/2008 | Park ....................... | H02J 7/025 320/108 |

(Continued)

FOREIGN PATENT DOCUMENTS

| | | |
|---|---|---|
| CN | 102165667 A | 8/2011 |
| JP | 2001-095167 A | 4/2001 |

(Continued)

*Primary Examiner* — Richard Isla
*Assistant Examiner* — Dung V Bui
(74) *Attorney, Agent, or Firm* — Oliff PLC

(57) ABSTRACT

A control device on a power receiving side includes a charging portion that charges a battery based on power that is received by a power receiving portion that receives power from a power transmitting device, a control portion 54 that performs charging control, and a nonvolatile memory. The nonvolatile memory stores status information of the battery, and the control portion performs charging control based on the status information stored in the nonvolatile memory.

6 Claims, 20 Drawing Sheets

(56) References Cited

U.S. PATENT DOCUMENTS

| | | | | |
|---|---|---|---|---|
| 2009/0174340 A1* | 7/2009 | Kumagai | | H02M 3/155 315/291 |
| 2011/0169446 A1 | 7/2011 | Kondo | | |
| 2011/0234617 A1* | 9/2011 | Watanabe | | G06F 1/3203 345/589 |
| 2012/0043931 A1* | 2/2012 | Terao | | H02J 7/025 320/108 |
| 2012/0262109 A1* | 10/2012 | Toya | | H01M 10/44 320/108 |
| 2012/0306284 A1* | 12/2012 | Lee | | H02J 50/40 307/104 |
| 2013/0007482 A1* | 1/2013 | Rodriguez | | H04W 52/0251 713/320 |
| 2013/0320096 A1* | 12/2013 | Springer | | G06K 19/0723 235/492 |
| 2014/0028244 A1* | 1/2014 | Korekoda | | H01M 10/44 320/106 |
| 2014/0192583 A1* | 7/2014 | Rajan | | G11C 7/10 365/63 |
| 2014/0253086 A1* | 9/2014 | Rosu-Hamzescu | | H03K 17/0822 323/311 |
| 2014/0320089 A1 | 10/2014 | Wang et al. | | |
| 2015/0084438 A1* | 3/2015 | Beckman | | H02J 50/12 307/149 |
| 2015/0123602 A1* | 5/2015 | Patino | | H02J 7/025 320/108 |
| 2015/0236757 A1* | 8/2015 | Lee | | H04B 5/0037 320/108 |

FOREIGN PATENT DOCUMENTS

| | | |
|---|---|---|
| JP | 2005-043059 A | 2/2005 |
| JP | 2006-115592 A | 4/2006 |
| JP | 2008-206232 A | 9/2008 |
| JP | 2009-011129 A | 1/2009 |
| JP | 2010-200509 A | 9/2010 |
| JP | 2011-205867 A | 10/2011 |
| JP | 2014-187848 A | 10/2014 |
| WO | 2010/035545 A1 | 4/2010 |

* cited by examiner

| 16bit | 16bit | 16bit | 16bit |
|---|---|---|---|
| 00h | (1) DATA CODE + RECTIFICATION VOLTAGE | (2)(3)(4)(5)(6)(7) | (8)CRC |

FIG. 19A

| | bit15 ... bit0 |
|---|---|
| (1) | DATA CODE \| RECTIFICATION VOLTAGE |
| (2) | TEMPERATURE |
| (3) | CHARGE VOLTAGE |
| (4) | CHARGE CURRENT |
| (5) | STATUS FLAG |
| (6) | NUMBER OF CYCLES |
| (7) | IC NUMBER |
| (8) | CRC |

FIG. 19B

CONTROL DEVICE, ELECTRONIC APPARATUS, AND CONTACTLESS POWER TRANSMISSION SYSTEM

BACKGROUND

1. Technical Field

The present invention relates to a control device, an electronic apparatus, a contactless power transmission system, and the like.

2. Related Art

In recent years, much attention has been paid to contactless power transmission (wireless power transfer) in which electromagnetic induction is used to make power transmission possible without metal contact. Charging of electronic apparatuses such as a household appliance and a mobile terminal has been proposed as an application example of contactless power transmission.

Various charging control methods in contactless power transmission have been disclosed. For example, a method is disclosed in JP-A-2008-202632 in which an operating state of a charging control portion in a power receiving device is maintained by performing power saving power transmission in a fully charged state. With the method disclosed in JP-A-2008-202632, a smooth return to normal power transmission or suspension of power transmission when the power receiving device is removed while power saving power transmission is being performed can be easily realized, and therefore wasteful power consumption can be suppressed.

Also, a method is disclosed in JP-A-2009-11129 in which a switch is provided in a power transmitting device side, and a tentative power transmission for authentication is performed based on the switch operation.

Also, a charging control method referred to as smart charging is disclosed in US-A1-2014-0320089.

It is preferable that, when a power receiving device includes a battery (secondary battery), status information of the battery is stored, and control is performed based on the status information. For example, if any error information is stored as the status information, a serious problem such as breakdown of or damage to an apparatus can be prevented from occurring as a result of performing control based on the error. Alternatively, if the number of charging times information of the battery is stored, evaluation of the degree of deterioration of the battery becomes possible. Alternatively, if a past charge voltage is stored, charging control such as the smart charging disclosed in US-A1-2014-0320089 is possible. However, a configuration in which a nonvolatile memory for storing the status information is included on the power receiving device side in a contactless power transmission system is not disclosed in known methods, and neither is control based on the information stored in the nonvolatile memory disclosed.

SUMMARY

According to some aspects of the invention, a control device, an electronic apparatus, a contactless power transmission system, or the like, that perform appropriate control based on status information stored in a nonvolatile memory can be provided.

One aspect of the invention relates to a control device on a power receiving device side in a contactless power transmission system including a power transmitting device and a power receiving device. The control device includes: a charging portion that charges a battery based on power received by a power receiving portion that receives power from the power transmitting device; a control portion that performs charging control; and a nonvolatile memory. The nonvolatile memory stores status information of the battery, and the control portion performs the charging control based on the status information stored in the nonvolatile memory.

According to the one aspect of the invention, the nonvolatile memory provided on the power receiving device side of the contactless power transmission system stores the status information of the battery, and the control portion of the receiving side control device performs charging control based on the status information stored in the nonvolatile memory. In this way, the status information of the battery can be appropriately stored on the power receiving device side, and appropriate charging control based on the status of the battery or the like is made possible.

Also, according to the one aspect of the invention, the nonvolatile memory may store temperature abnormality detection information as the status information.

Accordingly, the temperature abnormality detection information is stored in the nonvolatile memory, and charging control can be performed based on the temperature abnormality detection information.

Also, according to the one aspect of the invention, the control device further includes a load modulation portion that transmits communication data to the power transmitting device by load modulation. The load modulation portion, in a case where abnormal temperature is detected, may transmit the temperature abnormality detection information to the power transmitting device by the load modulation.

Accordingly, the temperature abnormality detection information can be transmitted to the power transmitting device side by load modulation.

Also, according to the one aspect of the invention, the nonvolatile memory may store number of charging times information representing the number of charging times of the battery as the status information.

Accordingly, the number of charging times of the battery can be stored as the status information.

Also, according to the one aspect of the invention, the control portion may not update the number of charging times information in the nonvolatile memory in a case where the temperature abnormality detection information is stored in the nonvolatile memory, and may update the number of charging times information in the nonvolatile memory in a case where the temperature abnormality detection information is not stored in the nonvolatile memory.

Accordingly, whether or not the number of charging times is updated can be appropriately determined based on the temperature abnormality detection information.

Also, according to the one aspect of the invention, the nonvolatile memory may store a battery voltage when abnormal temperature is detected as the status information.

Accordingly, the battery voltage when abnormal temperature is detected can be stored as the status information.

Also, according to the one aspect of the invention, even in a case where the temperature abnormality detection information is stored in the nonvolatile memory, in a case where the battery voltage has decreased from the battery voltage stored in the nonvolatile memory by a predetermined voltage, the control portion may update the number of charging times information in the nonvolatile memory.

Accordingly, in the case where the temperature abnormality detection information is stored, whether or not the number of charging times is updated or not can be appropriately determined by referring to a change in the battery voltage.

Also, according to the one aspect of the invention, when the status information is stored in the nonvolatile memory, the control portion, after having written the status information to a first address, may write the status information to a second address that is different from the first address after a given period has elapsed.

Accordingly, the likelihood of information being appropriately written can be improved.

Also, according to the one aspect of the invention, the nonvolatile memory may operate with a power supply voltage based on an output voltage of the power receiving portion.

Accordingly, the nonvolatile memory can be operated with a voltage based on the output voltage of the power receiving portion.

Also, according to the one aspect of the invention, the nonvolatile memory may store charging control information of the battery.

Accordingly, the charging control information can also be stored in the nonvolatile memory along with the status information.

Also, another aspect of the invention relates to a control device on a power transmitting side in a contactless power transmission system including a power transmitting device and a power receiving device. The control device includes: a driver control circuit that controls a power transmission driver in a power transmission portion that transmits power to the power receiving device; a control portion that controls the driver control circuit; and a communication portion that performs communication processing with the power receiving device that transmits communication data by load modulation. The control portion, in a case of receiving communication data including temperature abnormality detection information from the power receiving device, causes the power transmission portion to perform intermittent power transmission.

According to the other aspect of the invention, the control device on the power transmitting side in the contactless power transmission system, in a case of receiving communication data including temperature abnormality detection information from the power receiving device that performs load modulation, causes the power transmission portion to perform intermittent power transmission. In this way, appropriate power transmission control and the like can be performed in the case where abnormal temperature occurs on the power receiving device side.

Also, another aspect of the invention relates to an electronic apparatus including the aforementioned control device.

Also, another aspect of the invention relates to a contactless power transmission system including a power transmitting device and a power receiving device. The power transmitting device transmits power to the power receiving device, and performs communication processing with the power receiving device that transmits communication data by load modulation. The power receiving device includes a nonvolatile memory that stores status information of a battery, charges the battery based on the power received from the power transmitting device and the status information stored in the nonvolatile memory, and transmits communication data to the power transmitting device by the load modulation. The power receiving device, in a case where abnormal temperature is detected, stores temperature abnormality detection information in the nonvolatile memory as the status information, and transmits the temperature abnormality detection information to the power transmitting device by the load modulation. The power transmitting device, in a case where the communication data including the temperature abnormality detection information is received from the power receiving device, transmits power to the power receiving device by intermittent power transmission.

According to the other aspects of the invention, the power receiving device, in the case where abnormal temperature is detected, stores temperature abnormality detection information in the nonvolatile memory, and transmits the temperature abnormality detection information to the power transmitting device. The power transmitting device, in the case of receiving temperature abnormality detection information, performs intermittent power transmission. In this way, by using the temperature abnormality detection information, appropriate control with respect to abnormal temperature and the like can be performed in both the power receiving device and the power transmitting device.

BRIEF DESCRIPTION OF THE DRAWINGS

The invention will be described with reference to the accompanying drawings, wherein like numbers reference like elements.

FIGS. 19A and 19B are examples of a format of communication data.

DESCRIPTION OF EXEMPLARY EMBODIMENTS

Figure 1:
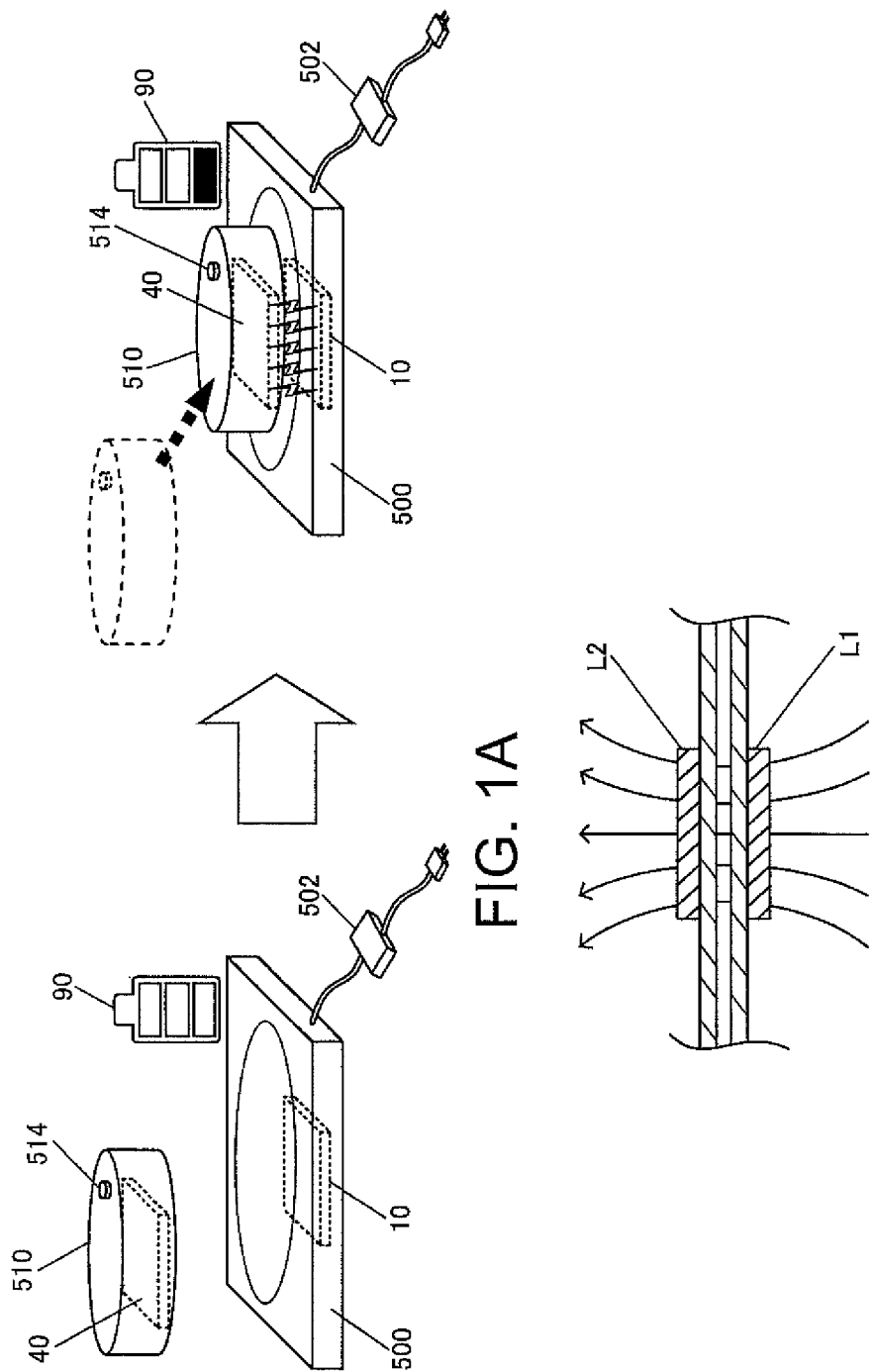
FIGS. 1A and 1B are diagrams for describing a contactless power transmission system of a present embodiment.

Hereinafter, a preferable embodiment of the invention will be described in detail. Note that the embodiment described below is not intended to unduly limit the content of the invention described in the scope of claims, and not all configurations described in this embodiment are necessarily essential as solving means of the invention.

1. Electronic Apparatus

An example of a contactless power transmission system of the present embodiment is shown in FIG. 1A. A charger 500 (one of electronic apparatuses) includes a power transmitting device 10. An electronic apparatus 510 includes a power receiving device 40. Also, the electronic apparatus 510 includes an operation switch portion 514 and a battery 90. Note that, although the battery 90 is schematically illustrated in FIG. 1A, the battery 90 is in actuality incorporated in the electronic apparatus 510. The contactless power transmission system of the present embodiment is constituted by the power transmitting device 10 and the power receiving device 40 in FIG. 1A.

Power is supplied to the charger 500 via a power supply adapter 502, and this power is transmitted by contactless power transmission from the power transmitting device 10 to the power receiving device 40. Accordingly, the battery 90 in the electronic apparatus 510 can be charged and allow a device in the electronic apparatus 510 to operate.

Note that a power supply of the charger 500 may be a power supply using a USB (USB cable). Also, various apparatuses can be envisioned as the electronic apparatus 510 to which the present embodiment is applied. For example, various electronic apparatuses can be envisioned such as a hearing aid, a watch, a biological information measuring device (wearable apparatus), a mobile information terminal (such as a smartphone or a cellular phone), a cordless telephone, a shaver, an electric toothbrush, a wrist computer, a handy terminal, an electric car, and an electric bicycle.

As schematically shown in FIG. 1B, power transmission from the power transmitting device 10 to the power receiving device 40 is realized as a result of forming a power transmission transformer by electromagnetically coupling a primary coil L1 (power transmitting coil) provided on a power transmitting side and a secondary coil L2 (power receiving coil) provided on a power receiving side, or the like. Accordingly, contactless power transmission is made possible.

2. Power Transmitting Device, Power Receiving Device, Control Devices on Power Transmitting Side and Receiving Side An exemplary configuration of the power transmitting device 10, the power receiving device 40, a transmitting side control device 20, and a receiving side control device 50 of the present embodiment is shown in FIG. 2. An electronic apparatus on the power transmitting side such as the charger 500 in FIG. 1A includes at least the power transmitting device 10 in FIG. 2. Also, the electronic apparatus 510 on the power receiving side can include at least the power receiving device 40, the battery 90, and a power supply target 100. The power supply target 100 can be various devices such as a processing unit (such as DSP). According to the configuration in FIG. 2, a contactless power transmission (wireless power transfer) system is realized in which power is transmitted from the power transmitting device 10 to the power receiving device 40 by electromagnetically coupling the primary coil L1 and the secondary coil L2, and charging of the battery 90 or the like is performed.

The power transmitting device 10 (power transmission module, primary module) includes the primary coil L1, a power transmission portion 12, a display portion 16, and a control device 20. Note that the power transmitting device 10 is not limited to the configuration in FIG. 2, and various modifications can be implemented such as omitting a portion (such as the display portion, for example) of the constituent elements, adding another constituent element, or changing connection relationship.

When power is to be transmitted, the power transmission portion 12 generates an AC voltage of a predetermined frequency and supplies the voltage to the primary coil L1. The power transmission portion 12 includes a first power transmission driver DR1 that drives one end of the primary coil L1, a second power transmission driver DR2 that drives the other end of the primary coil L1, and a power supply voltage control portion 14. Also, the power transmission portion 12 can include at least one capacitor that constitutes a resonance circuit with the primary coil L1.

The power transmission drivers DR1 and DR2 in the power transmission portion 12 are each realized by an inverter circuit (buffer circuit) constituted by a power MOS transistor or the like, for example. These power transmission drivers DR1 and DR2 are controlled (driven) by a driver control circuit 22 in the control device 20.

The power supply voltage control portion 14 in the power transmission portion 12 controls a power supply voltage VDRV of the power transmission drivers DR1 and DR2. For example, a control portion 24 controls the power supply voltage control portion 14 based on communication data received from the power receiving side. Accordingly, the power supply voltage VDRV supplied to the power transmission drivers DR1 and DR2 is controlled, and variable control of the transmitting power is realized, for example. The power supply voltage control portion 14 can be realized by a DC/DC converter or the like. For example, the power supply voltage control portion 14 performs a step-up operation on the power supply voltage (5 V, for example) from the power supply, generates a power supply voltage VDRV (6 V to 15 V, for example) for the power transmission drivers, and supplies the power supply voltage VDRV to the power transmission drivers DR1 and DR2. Specifically, when increasing the transmitting power from the power transmitting device 10 to the power receiving device 40, the power supply voltage control portion 14 increases the power supply voltage VDRV that is supplied to the power transmission drivers DR1 and DR2, and when decreasing the transmitting power, the power supply voltage control portion 14 decreases the power supply voltage VDRV.

A power transmission transformer is formed when the primary coil L1 (transmission side coil) is electromagnetically coupled to the secondary coil L2 (receiving side coil). For example, when power transmission is needed, the electronic apparatus 510 is placed on the charger 500 so as to be in a state in which a magnetic flux of the primary coil L1 passes through the secondary coil L2, as shown in FIGS. 1A and 1B. On the other hand, when power transmission is not needed, the electronic apparatus 510 is physically separated from the charger 500 so as to be in a state in which the magnetic flux of the primary coil L1 does not pass through the secondary coil L2.

The display portion 16 displays various states (such as being in power transmission or ID authentication) of the contactless power transmission system using a color, an image, or the like, and can be realized by an LED, an, LCD, or the like.

The control device 20 performs various types of control on the power transmitting side, and can be realized by an integrated circuit device (IC) or the like. The control device 20 includes the driver control circuit 22, the control portion 24, and a communication portion 30. Also, the control device 20 can include a clock generation circuit 37 and an oscillator circuit 38. Note that the control device 20 is not limited to the configuration in FIG. 2, and various modifications can be implemented such as omitting a portion (such as the clock generation circuit or the oscillator circuit) of the constituent elements, adding another constituent element, or changing connection relationships. For example, a modification in which the power transmission portion 12 or the like is incorporated in the control device 20 can be implemented.

The driver control circuit 22 controls the power transmission drivers DR1 and DR2 in the power transmission portion 12 that transmits power to the power receiving device 40. For example, the driver control circuit 22 outputs a control signal (drive signal) to gates of transistors that constitute the power transmission drivers DR1 and DR2, and causes the power transmission drivers DR1 and DR2 to drive the primary coil L1.

The control portion 24 executes various types of control processing of the transmitting side control device 20. For example, the control portion 24 controls the driver control circuit 22. Specifically, the control portion 24 performs various types of sequence control and judgement processing necessary for power transmission, communication processing, and the like. The control portion 24 can be realized by a logic circuit such as a gate array that is generated by an automated place-and-route method, or various processors such as a microcomputer, for example.

The communication portion 30 performs communication processing for the communication of communication data with the power receiving device 40. For example, the communication portion 30 performs communication processing for communication with the power receiving device 40 (control device 50) that transmits communication data by load modulation. Specifically, the communication portion 30 performs processing for detecting and receiving communication data from the power receiving device 40

The oscillator circuit 38 is constituted by a crystal-oscillator circuit or the like, and generates a clock signal for the primary side. The clock generation circuit 37 generates a drive clock signal that defines a drive frequency, or the like. Also, the driver control circuit 22 generates a control signal having a given frequency (drive frequency) based on the drive clock signal and the control signal from the control portion 24, and outputs the control signal to the power transmission drivers DR1 and DR2 in the power transmission portion 12 for control.

The power receiving device 40 (power receiving module, secondary module) includes the secondary coil L2 and the control device 50. Note that the power receiving device 40 is not limited to the configuration in FIG. 2, and various modifications can be implemented such as omitting a portion of the constituent elements, adding another constituent element, or changing connection relationships.

The control device 50 performs various types of control on the power receiving side, and is realized by an integrated circuit device (IC) or the like. The control device 50 includes a power receiving portion 52, a control portion 54, a load modulation portion 56, a charging portion 58, and a discharging portion 60. Also, the control device 50 can include a nonvolatile memory 62 and a detection portion 64. Note that the control device 50 is not limited to the configuration in FIG. 2, and various modifications can be implemented such as omitting a portion of the constituent elements, adding another constituent element, or changing connection relationships. For example, a modification is possible in which the power receiving portion 52 or the like is provided outside the control device 50.

The power receiving portion 52 receives power from the power transmitting device 10. Specifically, the receiving portion 52 converts an AC voltage induced in the secondary coil L2 to a DC rectified voltage VCC, and outputs the rectified voltage VCC. This conversion is performed by a rectifier circuit 53 included in the power receiving portion 52. The rectifier circuit 53 can be realized by a plurality of transistors, diodes, and the like.

The control portion 54 performs various types of control processing on the receiving side control device 50. For example, the control portion 54 controls a load modulation portion 56, a charging portion 58, and a discharging portion 60. Also, the control portion 54 can control the power receiving portion 52, the nonvolatile memory 62, the detection portion 64, and the like. The control portion 54 can be realized by a logic circuit such as a gate array that is generated by an automated place-and-route method, or various processors such as a microcomputer, for example.

The load modulation portion 56 performs load modulation. For example, the load modulation portion 56 includes a current source IS, and performs load modulation using the current source IS. Specifically, the load modulation portion 56 includes the current source IS (constant current source) and a switching element SW. The current source IS and the switching element SW are provided in series between a node NVC of the rectified voltage VCC and a GND (low potential side power supply voltage, in a broad sense) node, for example. The switching element SW is turned on and off based on a control signal from the control portion 54, for example, and a current (constant current) of the current source IS that flows from the node NVC to GND is caused to flow or cut off, and thereby the load modulation is realized.

Note that one end of a capacitor CM is connected to the node NVC. The capacitor CM is provided as a component external to the control device 50, for example. Also, the switching element SW can be realized by a MOS transistor or the like. The switching element SW may be provided as a portion of the transistors that constitute a circuit of the current source IS. Also, the load modulation portion 56 is not limited to the configuration in FIG. 2, and various modifications such as using a resistor in place of the current source IS can be implemented.

The charging portion 58 performs charging (charging control) of the battery 90. For example, the charging portion 58 charges the battery 90 based on the power received by the power receiving portion 52 that receives power from the power transmitting device 10. For example, the charging portion 58 is supplied with a voltage that is based on the rectified voltage VCC (DC voltage, in a broad sense) from the power receiving portion 52, and charges the battery 90. The charging portion 58 may include a CC charging circuit 59. The CC charging circuit 59 is a circuit that performs CC (Constant-Current) charging of the battery 90.

The discharging portion 60 performs a discharging operation for discharging the battery 90. For example, the discharging portion 60 (power supply portion) performs the discharging operation for discharging the battery 90, and supplies power from the battery 90 to a power supply target

100. For example, the discharging portion 60 is supplied with a battery voltage VBAT from the battery 90, and supplies an output voltage VOUT to the power supply target 100. The discharging portion 60 can include a charge pump circuit 61. The charge pump circuit 61 steps down the battery voltage VBAT (to a third of the input voltage, for example), and supplies the stepped down voltage to the power supply target 100 as the output voltage VOUT (VBAT/3). The discharging portion 60 (charge pump circuit) operates with the battery voltage VBAT as the power supply voltage.

The battery 90 is, for example, a rechargeable secondary battery, and is a lithium battery (such as a lithium ion secondary battery or a lithium ion polymer secondary battery), a nickel battery (such as a nickel-hydrogen storage battery or a nickel-cadmium storage battery), or the like. The power supply target 100 is a device (integrated circuit device) such as a processing unit (DSP, microcomputer) that is provided in the electronic apparatus 510 (FIG. 1A) in which the power receiving device 40 is incorporated, and is a power supply target of the battery 90.

The nonvolatile memory 62 is a nonvolatile memory device that stores various types of information. The nonvolatile memory 62 stores various types of information such as later-described status information of the battery 90 and status information of the power receiving device 40 (control device 50), for example. An EEPROM or the like can be used as the nonvolatile memory 62. MONOS (Metal-Oxide-Nitride-Oxide-Silicon) type memory can be used as the EEPROM, for example. A flash memory using a MONOS type memory can be used, for example. Alternatively, other types of memories such as a floating-gate type memory may be used as the EEPROM.

The detection portion 64 performs various detection operations. For example, the detection portion 64 performs various detection operations by monitoring the rectified voltage VCC, the battery voltage VBAT, and the like. Specifically, the detection portion 64 includes an A/D converter circuit 65, performs A/D conversion on voltages based on the rectified voltage VCC and the battery voltage VBAT, a temperature detection voltage from an unshown temperature detection portion, and the like with the A/D converter circuit 65, and executes a detection operation using the obtained digital A/D converted values. Detection of over-discharge, over-voltage, over-current, and abnormal temperature (high temperature, low temperature) are envisioned as detection operations performed by the detection portion 64. For example, over-voltage protection, high temperature protection, and low temperature protection can be realized by the detection portion 64 detecting over-voltage and abnormal temperature during the charging. Also, over-discharge protection and over-current protection can be realized by the detection portion 64 detecting over-discharge and over-current during the discharging.

3. Outline of Operation Sequence of Contactless Power Transmission System

Figure 3:
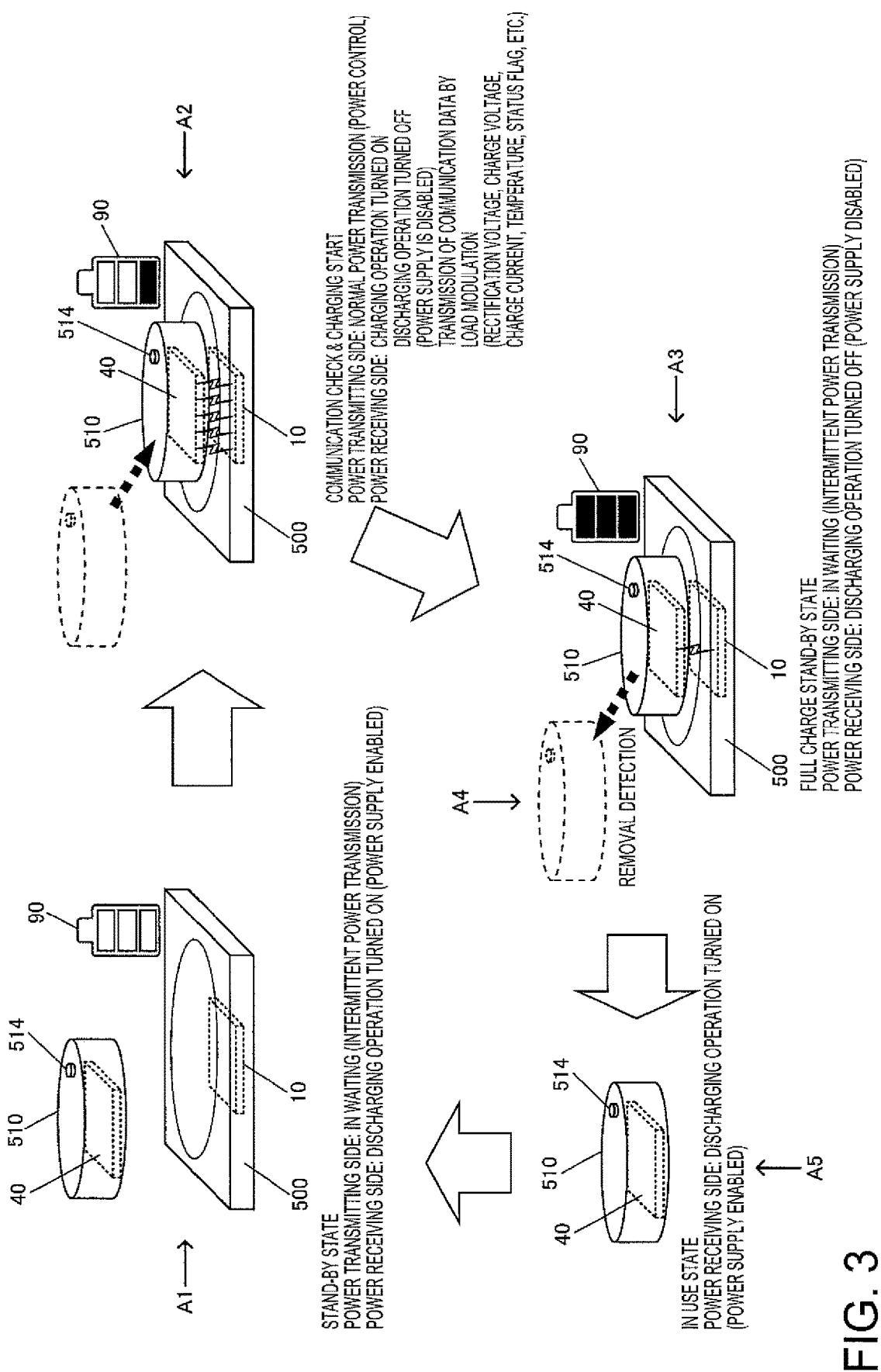
FIG. 3 is a diagram for describing an outline of an operation sequence of the contactless power transmission system of the present embodiment.

Next, an example of an operation sequence of the contactless power transmission system of the present embodiment will be described. FIG. 3 is a diagram for describing the outline of the operation sequence.

In A1 in FIG. 3, the electronic apparatus 510 including the power receiving device 40 is not placed on the charger 500 including the power transmitting device 10, and is in a removed state. In this case, a stand-by state is realized. In the stand-by state, the power transmitting side is in a waiting state, and the power receiving side is in a state where the discharging operation is turned on.

Specifically, in the stand-by state, the power transmission portion 12 of the power transmitting device 10 performs intermittent power transmission for landing detection. That is, the power transmission portion 12 is in a state in which continuous power transmission such as normal power transmission is not performed, and intermittent power transmission in which power is intermittently transmitted in given intervals is performed so as to detect landing of the electronic apparatus 510. Also, in the stand-by state, the operation for discharge to the power supply target 100 is turned on in the power receiving device 40, and power supply to the power supply target 100 is enabled. That is, the discharging portion 60 in the power receiving device 40 performs an operation of discharging the power from the battery 90 to the power supply target 100. Accordingly, the power supply target 100 such as a processing unit is supplied with the power from the battery 90, and can operate.

As shown in A2 in FIG. 3, when the electronic apparatus 510 is placed on the charger 500, and landing is detected, a communication check & charge state is realized. In the communication check & charge state, normal power transmission is performed on the power transmitting side, and the charging operation is turned on and the discharging operation is turned off on the power receiving side. Also, transmission of the communication data by load modulation is performed on the power receiving side.

Specifically, in the communication check & charge state, the power transmission portion 12 in the power transmitting device 10 performs normal power transmission which is continuous power transmission. Here, the power transmission portion 12 performs normal power transmission while performing power control in which the power is variably changed depending on the state of power transmission or the like. Also, control based on the charge state of the battery 90 is performed. The power transmission state is a state determined by a positional relationship (distance between coils or the like) between the primary coil L1 and the secondary coil L2 or the like, and can be determined based on information such as the rectified voltage VCC which is the output voltage from the power receiving portion 52. The charge state of the battery 90 can be determined based on the information such as the battery voltage VBAT.

Also, in the communication check & charge state, the charging operation of the charging portion 58 in the power receiving device 40 is turned on, and charging of the battery 90 is performed based on the power received by the power receiving portion 52. Also, the discharging operation of the discharging portion 60 is turned off, and power from the battery 90 is not supplied to the power supply target 100. Also, in the communication check & charge state, communication data is transmitted to the power transmitting side by load modulation performed by the load modulation portion 56. For example, communication data including power transmission status information (such as VCC), charge status information (such as VBAT and various status flags), and information such as a temperature is transmitted from the power receiving side to the power transmitting side by regular load modulation in a normal power transmission period. For example, power control by the power supply voltage control portion 14 in the power transmission portion 12 is performed based on the power transmission status information or the like included in the communication data.

As shown in A3 in FIG. 3, when full charge of the battery 90 is detected, a full charge stand-by state is realized. In the full charge stand-by state, the power transmitting side is in a waiting state, and the power receiving side is in a state in which the discharging operation remains off.

Specifically, the power transmission portion 12 performs intermittent power transmission for removal detection, for example. That is, the power transmission portion 12 is in a state in which continuous power transmission such as normal power transmission is not performed, and intermittent power transmission in which power is intermittently transmitted in given intervals is performed so as to detect removal of the electronic apparatus 510. Also, the discharging operation of the discharging portion 60 remains off, and the power supply to the power supply target 100 remains to be disabled.

When removal of the electronic apparatus 510 is detected as shown in A4 in FIG. 3, the electronic apparatus 510 is in a use state, and the discharging operation of the power receiving side is turned on, as shown in A5 in FIG. 3.

Specifically, the discharging operation of the discharging portion 60 is switched from off to on, and the power from the battery 90 is supplied to the power supply target 100 via the discharging portion 60. Accordingly, power from the battery 90 is supplied, the power supply target 100 such as a processing unit operates with the power, and the electronic apparatus 510 is in a state in which a user can use it normally.

In the present embodiment, as described above, when landing of the electronic apparatus 510 is detected, normal power transmission is performed, and regular load modulation is performed in the normal power transmission period, as shown in A2 in FIG. 3. Also, when landing is detected, the discharging operation of the discharging portion 60 is stopped. In this regular load modulation, communication data including information for controlling power on the power transmitting side, and information representing status on the power receiving side is transmitted from the power receiving side to the power transmitting side. For example, by transmitting the information (power transmission status information) for power control, optimum power control based on the positional relationship or the like between the primary coil L1 and the secondary coil L2 can be realized, for example. Also, by transmitting the information representing the status on the power receiving side, an optimum and safe charging environment can be realized. Also, in the present embodiment, normal power transmission continues while the load modulation continues, and the discharging operation of the discharging portion 60 remains off.

Also, in the present embodiment, when full charge of the battery 90 is detected, normal power transmission is stopped, and intermittent power transmission for removal detection is performed, as shown in A3 in FIG. 3. When removal is detected and a removed period begins, the discharging operation of the discharging portion 60 is performed, as shown in A4 and A5 in FIG. 3. Accordingly, power from the battery 90 is supplied to the power supply target 100, and normal operation of the electronic apparatus 510 becomes possible. Note that landing detection and removal detection are performed based on the output voltage (rectified voltage VCC, for example) of the power receiving portion 52.

In the present embodiment, as described above, the discharging operation for discharge to the power supply target 100 is turned off in a charge period (normal power transmission period) of the battery 90 in the electronic apparatus 510, and therefore a situation in which power is wastefully consumed in the charge period by the power supply target 100 can be suppressed.

When removal of the electronic apparatus 510 is detected, the discharging operation for discharge to the power supply target 100 is turned on along with switching being performed from normal power transmission to intermittent power transmission. As a result of the discharging operation being turned on, power from the battery 90 is supplied to the power supply target 100, and a normal operation of the power supply target 100 such as a processing unit (DSP) becomes possible. In this way, an operation sequence of preferable contactless power transmission can be realized in a type of electronic apparatus 510 (electronic apparatus such as a hearing aid that is worn by a user) that does not operate in the charge period during which the electronic apparatus 510 is placed on the charger 500, for example. That is, energy saving can be realized in such a type of electronic apparatus 510 as a result of the discharging operation for the discharge of power from the battery 90 being turned off in the charge period (normal power transmission period). As a result of the discharging operation being automatically turned on when removal is detected, power from the battery 90 is supplied to various devices that are power supply targets 100 of the electronic apparatus 510 so that the devices can operate, and the electronic apparatus 510 can automatically shift to a normal operation mode.

Figure 4:
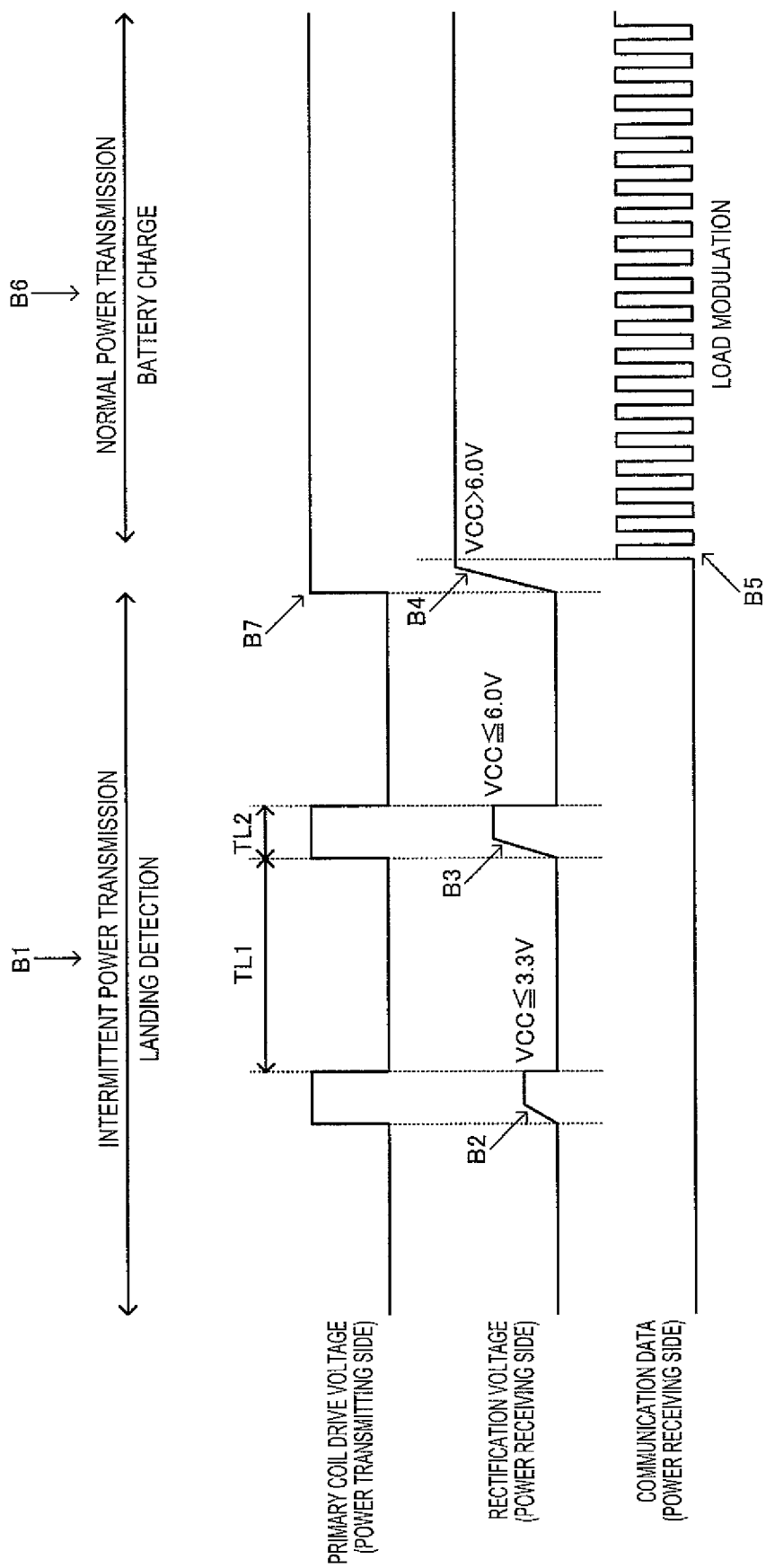
FIG. 4 is a signal waveform diagram for describing an operation sequence of the present embodiment.
Figure 5:
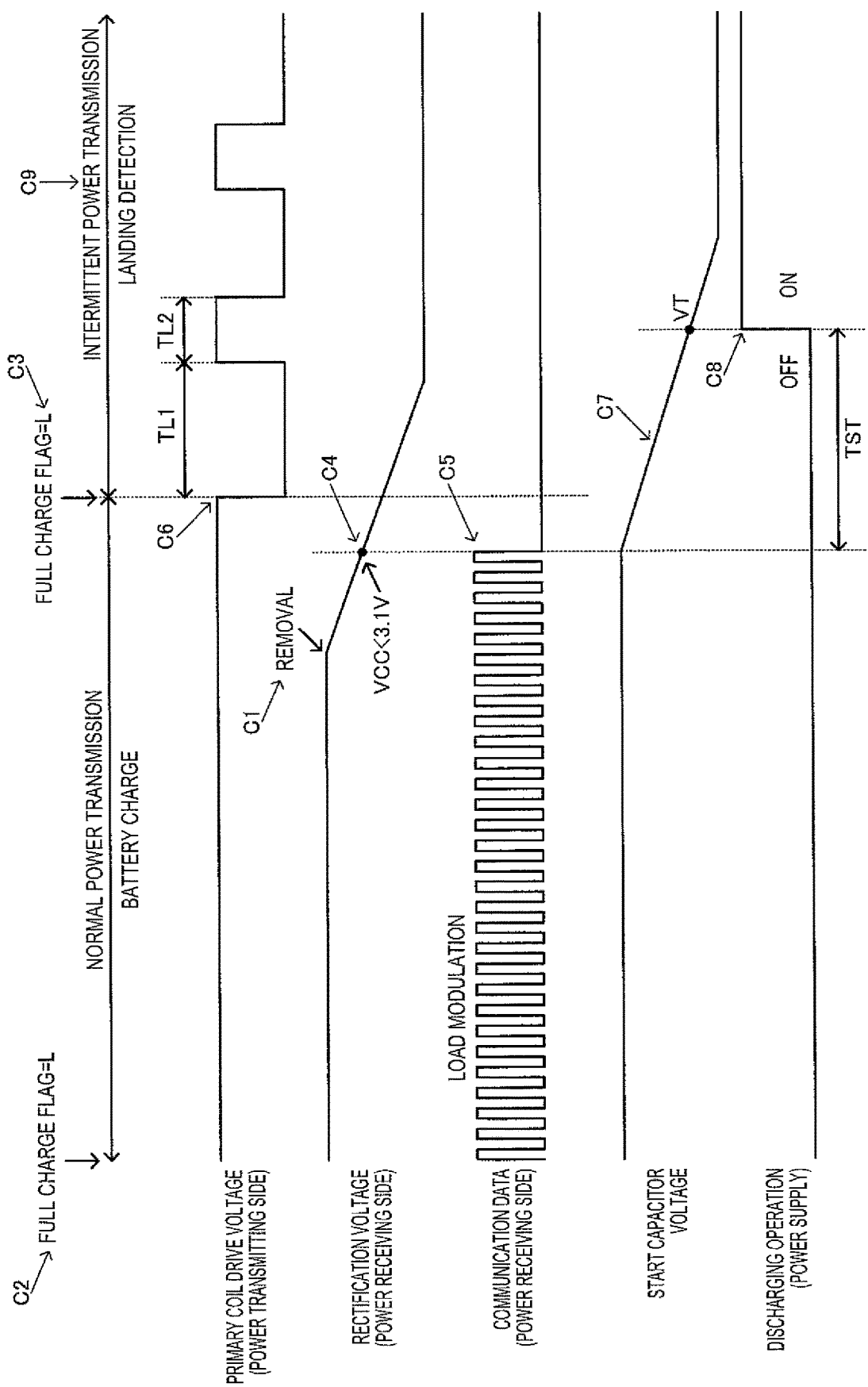
FIG. 5 is a signal waveform diagram for describing the operation sequence of the present embodiment.
Figure 6:
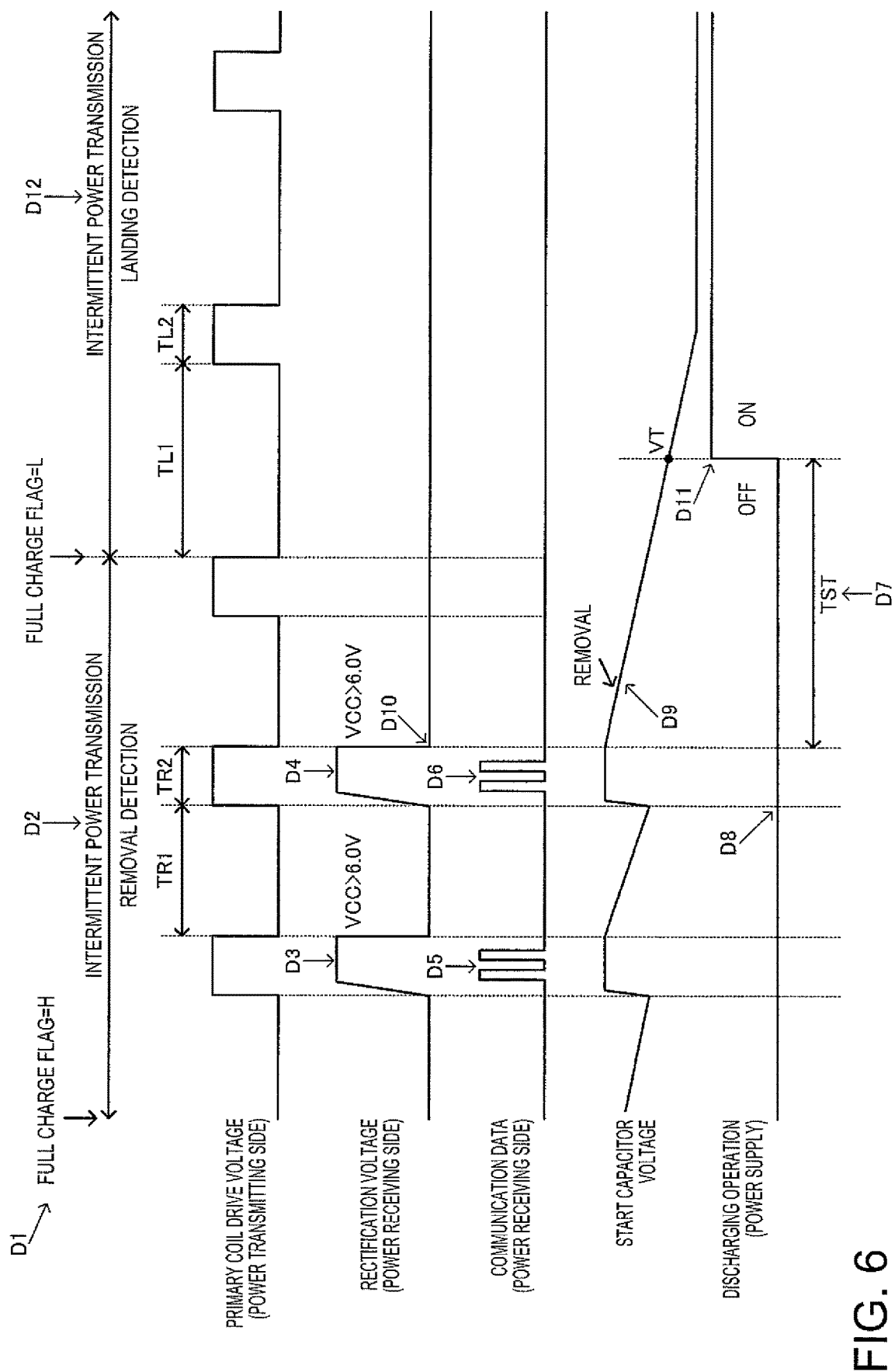
FIG. 6 is a signal waveform diagram for describing the operation sequence of the present embodiment.

FIGS. 4 to 6 are signal waveform diagrams for describing an operation sequence of the contactless power transmission system of the present embodiment.

B1 in FIG. 4 is the stand-by state in A1 in FIG. 3, and intermittent power transmission for landing detection is performed. That is, power transmission of a period TL2 is performed at the intervals of a period TL1. The period of TL1 is 3 s for example, and the period of TL2 is 50 ms for example. In B2 and B3 in FIG. 4, the rectified voltage VCC that is the output voltage of the power receiving portion 52 is less than or equal to 6.0 V, and therefore, communication by load modulation is not performed.

On the other hand, in B4, the rectified voltage VCC exceeds 6.0 V that is the threshold voltage for landing detection, and therefore the load modulation portion 56 starts load modulation, as shown in B5. That is, although the coils L1 and L2 are not in a sufficiently electromagnetically coupled state in B2 and B3, the coils L1 and L2 are in a properly electromagnetically coupled state in B4, as shown in FIG. 1B. Accordingly, the rectified voltage VCC increases and exceeds 6.0 V, and load modulation is started. Then, when this load modulation (null communication data) is detected on the power transmitting side, normal power transmission by the power transmission portion 12 is started as shown in B6. The normal power transmission in B6 is continuous power transmission that is different from the intermittent power transmission in B1, and charging of the battery 90 by the charging portion 58 is started by the power received due to the normal power transmission. At this time, a discharging operation of the discharging portion 60 is turned off. Also, the communication data including various types of information such as the rectified voltage, the battery voltage, or the status flag is transmitted from the power receiving side to the power transmitting side by the load modulation shown in B5, and power transmission control is executed. Note that the start of the load modulation in B5 is triggered by the increase of the rectified voltage VCC due to the intermittent power transmission for landing detection shown in B7.

In C1 in FIG. 5, the electronic apparatus 510 is removed in the normal power transmission period during which charging of the battery 90 is performed. The removal in C1 is a removal before the battery 90 is fully charged, as shown in C2 and C3. That is, it is a removal in a state in which a full charge flag is at a low level that is an inactive level.

When the electronic apparatus 510 is removed in this way, the power on the power transmitting side is not transmitted to the power receiving side, and the rectified voltage VCC which is the output voltage of the power receiving portion 52 decreases. Then, when VCC has decreased below 3.1 V, for example, as shown in C4, load modulation by the load modulation portion 56 is stopped, as shown in C5. When load modulation is stopped, normal power transmission by the power transmission portion 12 is stopped, as shown in C6.

Also, when the rectified voltage VCC (output voltage) decreases below 3.1 V, for example, which is a judgement voltage, discharge of an unshown start capacitor on the power receiving side is started. The start capacitor is a capacitor for starting up the discharging operation (for measurement of a start-up period) on the power receiving side, and is provided as a component external to the receiving side control device 50, for example. When a start-up period TST elapses after the rectified voltage VCC has decreased below the judgement voltage (3.1 V), the discharging operation of the discharging portion 60 is switched from off to on, as shown in C8, and power from the battery 90 starts to be supplied to the power supply target 100. Specifically, when the voltage of the start capacitor (charge voltage) decreases below a threshold voltage for turning on the discharging operation, a start-up period TST is determined to have elapsed, the discharging operation of the discharging portion 60 is turned on, and power from the battery 90 is discharged to the power supply target 100. Accordingly, the electronic apparatus 510 is in a usable state, as shown in A5 in FIG. 3. Also, the power transmission portion 12 starts to perform intermittent power transmission for landing detection, as shown in C9, after normal power transmission is stopped.

In D1 in FIG. 6, the full charge flag is at a high level which is an active level, and the full charge of the battery 90 is detected. When the full charge is detected in this way, the state is shifted to the full charge stand-by state, as shown in A3 in FIG. 3, and the intermittent power transmission for removal detection after full charge is performed, as shown in D2. That is, power transmission is performed during the period TR2 at the intervals of the period TR1. The period TR1 is 1.5 s, for example, and the period TR2 is 50 ms, for example. The period TR1 of the intermittent power transmission for removal detection is shorter than the period TL1 of the intermittent power transmission for landing detection.

The rectified voltage VCC in the power receiving portion 52 increases above 6.0 V due to the intermittent power transmission for removal detection, as shown in D3 and D4 in FIG. 6, and the load modulation is performed as shown in D5 and D6. The fact that the electronic apparatus 510 has not been removed can be detected on the power transmitting side by detecting the load modulation (null communication data or the like).

Also, the interval of the intermittent power transmission period TR1 (1.5 s, for example) for removal detection is shorter than the start-up period TST (3 s, for example) shown in D7 that is set by the aforementioned start capacitor. Therefore, in a state in which the electronic apparatus 510 is not removed, the voltage of the start capacitor (charge voltage) does not decrease below the threshold voltage VT for turning on the discharging operation, and switching from off to on of the discharging operation is not performed, as shown in D8.

On the other hand, the electronic apparatus 510 is removed in D9. The rectified voltage VCC of the power receiving portion 52 decreases below 3.1 V which is the judgement voltage, as shown in D10, after the intermittent power transmission period TR2 for removal detection shown in D4 ends, and therefore measurement of the start-up period TST shown in D7 is started. Then, in D11, the voltage of the start capacitor decreases below the threshold voltage VT for turning on the discharging operation, and the elapse of the start-up period TST is detected. Accordingly, the discharging operation of the discharging portion 60 is switched from off to on, and power from the battery 90 begins to be supplied to the power supply target 100. Also, as shown in D12, intermittent power transmission for landing detection of the electronic apparatus 510 begins to be performed.

Figure 7:
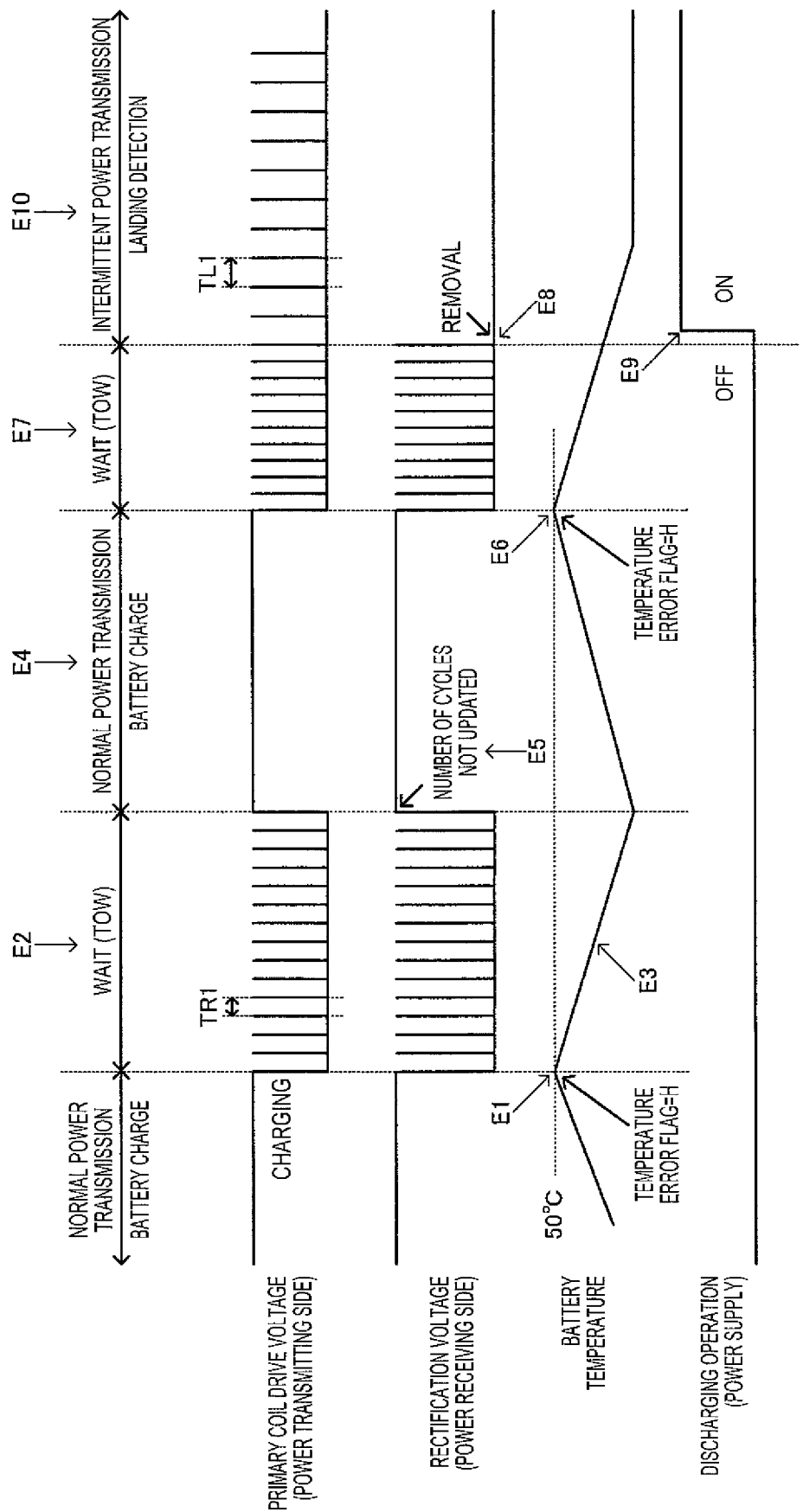
FIG. 7 is a signal waveform diagram for describing the operation sequence of the present embodiment.

FIG. 7 is a signal waveform diagram for describing the operation sequence in an overall wait state due to an occurrence of abnormal temperature (temperature error).

In E1 in FIG. 7, abnormal temperature (high temperature abnormality) whereby the battery temperature has reached 50° C. is detected, for example, and the temperature error flag is set to a high level, which is an active level. In the present embodiment in this case, an overall waiting period TOW is set as shown in E2. In the waiting period TOW, normal power transmission is suspended, and intermittent power transmission for removal detection is performed, for example. That is, the intermittent power transmission similar to that in the full charge stand-by state described in FIG. 6 is performed. For example, communication data including the temperature error flag is transmitted from the power receiving side by load modulation to the power transmitting side, and therefore normal power transmission of the power transmission portion 12 is suspended, and intermittent power transmission is started.

The length of the waiting period TOW is 5 minutes, for example, normal power transmission which is continuous power transmission is not performed in the waiting period TOW, and the battery 90 is not charged. Accordingly, heat is dissipated from the battery 90, and the battery temperature decreases, as shown in E3 in FIG. 7. Then, when the waiting period TOW has elapsed, normal power transmission is re-started and charging of the battery 90 is re-started, as shown in E4. At this time, in the present embodiment, update processing of the number of cycles that represents the number of charging times is not performed, as shown in E5. That is, because repetition of battery charging caused by the occurrence of abnormal temperature should not be included in the number of charging times, update processing in which the number of cycles (cycle times) is incremented by 1 is not performed.

In E6 in FIG. 7, the battery temperature again reaches 50° C., and the temperature error flag is set to a high level. Accordingly, the waiting period TOW shown in E7 is set, normal power transmission is suspended, and intermittent power transmission is started to be performed.

In E8 in FIG. 7, the electronic apparatus 510 is removed. When the voltage of the start capacitor described in FIG. 6 decreases below the threshold voltage VT, discharging operation of the discharging portion 60 is switched from off to on, as shown in E9. Then, intermittent power transmission for landing detection by the power transmission portion 12 is performed, as shown in E10.

In the present embodiment as described above, on the condition that the power receiving device 40 has started the load modulation, as shown in B5 in FIG. 4, normal power transmission by the power transmission portion 12 is started, as shown in B6. While the load modulation in B5 continues, the normal power transmission shown in B6 continues. Specifically, as shown in C5 in FIG. 5, in the case where load modulation is not detected any more, normal power transmission by the power transmission portion 12 is stopped as shown in C6. Then, intermittent power transmission for landing detection by the power transmission portion 12 begins to be performed, as shown in C9.

In the present embodiment as described above, an operation sequence is adopted in which normal power transmission is started on the condition that the load modulation has started, the normal power transmission continues while load modulation continues, and the normal power transmission is stopped when the load modulation is not detected any more. In this way, complex authentication processing or the like can be made unnecessary, and contactless power transmission and communication by load modulation can be realized in a simple operation sequence. Also, as a result of performing communication by regular load modulation during a normal power transmission period, effective contactless power transmission according to the state of the power transmission or the like can be realized.

Also, in the present embodiment, as shown in D1 in FIG. 6, in the case where full charge of the battery 90 in the power receiving device 40 is detected based on communication data from the power receiving side, normal power transmission by the power transmission portion 12 is stopped as shown in D2, and intermittent power transmission for removal detection begins to be performed. Then, when the electronic apparatus 510 is removed and the removal is detected as shown in D9, intermittent power transmission for landing detection by the power transmission portion 12 begins to be performed, as shown in D12.

In this way, when full charge is detected, normal power transmission which is continuous power transmission is stopped, intermittent power transmission in which power is intermittently transmitted begins. Accordingly, wasteful power consumption during a removal period or the like can be suppressed, and power saving or the like can be realized.

Also, in the present embodiment, in the case where an abnormality on the power receiving side is detected based on communication data, normal power transmission by the power transmission portion 12 is stopped, and intermittent power transmission for removal detection begins to be performed. The abnormality on the power receiving side is a battery charge error such as battery fail in which the voltage of the battery 90 decreases below 1.0 V, for example, a timer end error of a charging time exceeding a predetermined period (6 to 8 hours, for example), or the like. In this way, in the case where an abnormality on the power receiving side is detected, normal power transmission which is continuous power transmission is automatically stopped, and intermittent power transmission is started, and as a result safety, reliability, or the like can be secured.

Also, in the case where abnormal temperature occurs as an abnormality on the power receiving side as well, normal power transmission by the power transmission portion 12 is suspended, and intermittent power transmission for removal detection is performed. Note that, in the case of abnormal temperature, a special operation sequence as shown in FIG. 7 is executed. Specifically, as shown in E1 in FIG. 7, in the case where abnormal temperature (high temperature error) of the battery 90 in the power receiving device 40 is detected based on communication data (temperature error flag), normal power transmission is suspended, and intermittent power transmission by the power transmission portion 12 is performed during a waiting period TOW as shown in E2. Then, after the waiting period TOW has elapsed, normal power transmission by the power transmission portion 12 is resumed as shown in E4.

In this way, the waiting period TOW is set in the case of abnormal temperature, normal power transmission, which is continuous power transmission, is not performed during the waiting period TOW, and charging of the battery 90 is not performed as well. Accordingly, heat dissipation or the like of the battery 90 is possible using the waiting period TOW. Also, charging of the battery 90 by normal power transmission can be resumed after the waiting period TOW has elapsed. Accordingly, appropriate charging control or the like on the battery 90 under high temperature environment or the like can be realized, for example.

Also, in the present embodiment, as described in FIGS. 5 and 6, the power receiving device 40 discharges power from the battery 90 to the power supply target 100 after the rectified voltage VCC which is the output voltage of the power receiving portion 52 has decreased and the start-up period TST of the discharging operation has elapsed. Specifically, the discharging operation is started after the start-up period TST has elapsed after the rectified voltage VCC has decreased below the judgement voltage (3.1V). That is, as shown in C8 in FIG. 5 and D11 in FIG. 6, the discharging operation of the discharging portion 60 is turned on, and power from the battery 90 begins to be supplied to power supply target 100. Also, in the present embodiment, as shown in D2 and D7 in FIG. 6, intermittent power transmission for removal detection is performed at the intervals of period TR1 (1.5 s, for example) that is shorter than the start-up period TST (3 s, for example).

In this way, the start-up period TST does not elapse during the period TR1 for removal detection, and therefore the discharging operation of the discharging portion 60 is not turned on during intermittent power transmission period for removal detection. When the electronic apparatus 510 is removed, as shown in D9 in FIG. 6, the rectified voltage VCC no longer regularly rises as in an intermittent power transmission period for removal detection, and the discharging operation of the discharging portion 60 is turned on, as shown in D11, as a result of the start-up period TST having elapsed as shown in D7. Accordingly, the discharging operation of the discharging portion 60 is automatically turned on as a result of detecting removal of the electronic apparatus 510, and power from the battery 90 can by supplied to the power supply target 100.

4. Status Information Stored in Nonvolatile Memory, and Control Based on Status Information Next, details of a nonvolatile memory 62 included in the control device 50 of the power receiving device 40, and control of the power transmitting device 10 and the power receiving device 40 based on the information will be described.

4.1 Nonvolatile Memory

The nonvolatile memory 62 in the present embodiment operates with a power supply voltage based on the output voltage VCC of the power receiving portion 52. Specifically, the nonvolatile memory 62 operates with VD5 that is an output voltage of the regulator 57 which will be described with reference to FIG. 21. The regulator 57 is a regulator that outputs VD5 by regulating the output voltage VCC of the power receiving portion 52. More specifically, the nonvolatile memory 62 steps up VD5 internally and operates with a stepped up voltage.

Figure 8:
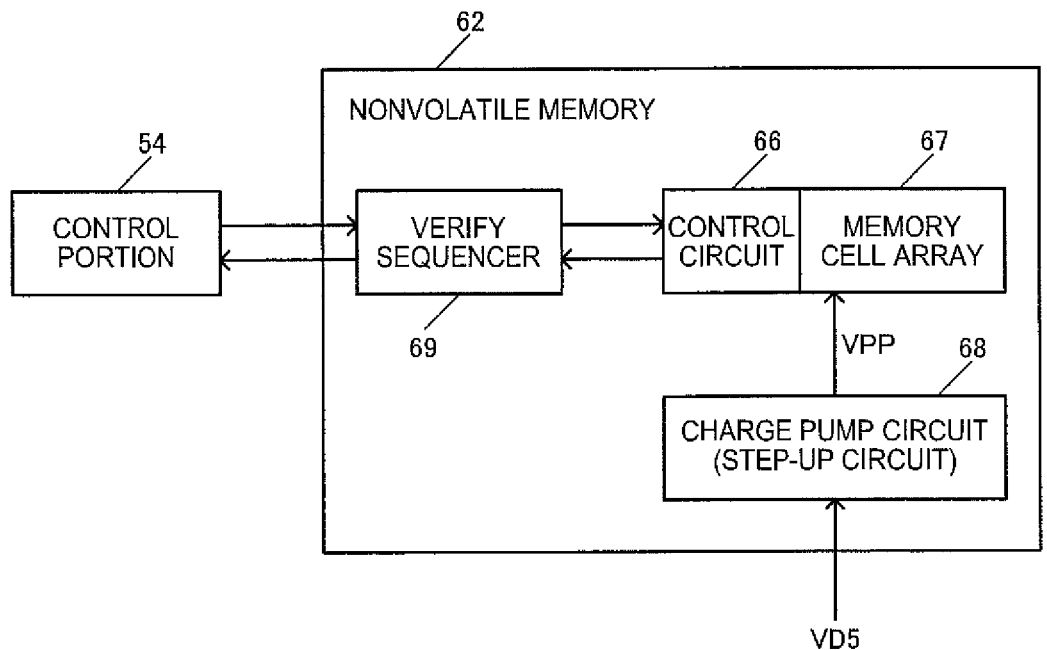
FIG. 8 illustrates an exemplary configuration of a nonvolatile memory.

FIG. 8 is an exemplary configuration of the nonvolatile memory 62. The nonvolatile memory 62 includes a verify sequencer 69, a control circuit 66, a memory cell array 67, and a charge pump circuit (step-up circuit) 68, as shown in FIG. 8. Note that the nonvolatile memory 62 is not limited to the configuration in FIG. 8, and various modifications can be implemented.

The verify sequencer 69 performs write, read, and data verify operations. Hereinafter, although an example of control in each of the operations will be described, various modifications can be implemented in a specific method. In the write operation, the verify sequencer 69 acquires 16-bit write data from the control portion 54, generates 16-bit ECC (Error Correcting Code) based on the acquired write data, and writes 32-bit data in which the write data and the ECC are combined in the memory cell array 67 (given memory cells included in the memory cell array 67, in a narrow sense).

In the read operation, 32-bit data including ECC is read out from the memory cell array 67, judgement is performed as to whether or not the data is damaged based on the ECC, and 16-bit data excluding the ECC is output to the control portion 54. Note that, when the data is damaged, error correcting processing is performed based on the ECC, and 16-bit data resulting from the error correcting processing may be output to the control portion 54. Note that the error correction here is an error correction in which a 1-bit error is corrected, for example.

Also, the verify sequencer 69 verifies, after data is written, whether the signal level of the memory cell included in the memory cell array 67 is appropriate.

Specific write and read operations are performed by the control circuit 66, the memory cell array 67, and the charge pump circuit 68. The charge pump circuit 68 is supplied with a voltage (VD5 as described above, for example) based on the output voltage VCC of the power receiving portion 52, and outputs a comparatively high voltage VPP for erasing and writing by stepping up the voltage. The control circuit 66 performs read, write, and erase operations by supplying appropriate voltages such as VPP to word lines, source lines, and bit lines that are provided in the memory cell array 67 based on the signal from the verify sequencer 69. Note that the nonvolatile memory 62 may use a structure such as the MONOS type as described above, for example, the structure of the memory cell is widely known, and therefore more detailed description is omitted.

The control portion 54 according to the present embodiment may include a charging system control portion and a discharging system control portion. The charging system control portion operates with a voltage based on the output voltage VCC of the power receiving portion 52, and controls portions of the charging system. Specifically, the charging system control portion operates with VD5 which will be described later with reference to FIG. 19, and controls the load modulation portion 56, the charging portion 58, the nonvolatile memory 62, and the like. Also, the discharging system control portion operates with a voltage based on the battery voltage VBAT, and controls portions of the charging system. Specifically, the discharging system control portion operates with the battery voltage VBAT and controls the discharging portion 60 and the like.

Control for starting discharging with a removal as a trigger is performed by the discharging system control portion. Specifically, the control device 50 may include a circuit that outputs a signal that is at a low level when VCC is 3.1 V or more, and is at a high level when VCC is less than 3.1 V. If a reset is performed when the signal is at a low level, and the reset is released when the signal is at a high level, the signal can be used as a power-on reset signal for the charging system control portion, and the circuit can be considered as a power-on reset circuit. Also, the signal may be output to the discharging system control portion, and control of charging and discharging of the start capacitor may be performed in the discharging system control portion based on the signal. As an example, the discharging system control portion may include a circuit that supplies a voltage based on VBAT to the start capacitor for charging when an input signal is at a high level and connects the start capacitor to ground (via a given resistor, for example) for discharging when the input signal is at a low level. Also, the discharging system control portion may control on and off of the discharging portion 60 (charge pump circuit 61) based on the above signal.

Figure 9:
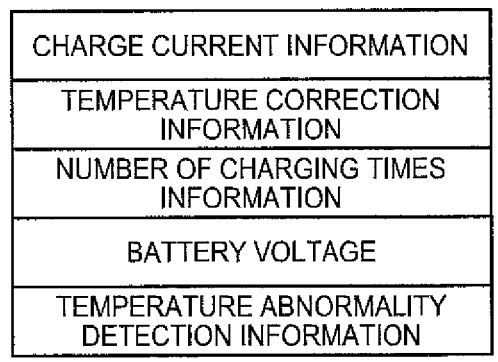
FIG. 9 illustrates an example of information stored in the nonvolatile memory.

An example of information stored in the nonvolatile memory 62 is shown in FIG. 9. The nonvolatile memory 62 stores charge current information, temperature correction information, number of charging times information, a battery voltage, and temperature abnormality detection information, as shown in FIG. 9. The status information of the battery 90 in the present embodiment is information that includes at least one of the number of charging times information, the battery voltage, and the temperature abnormality detection information.

The charge current information is a current value of a constant current used in CC charging, for example. More specifically, the charge current information may be a current value at normal charging that is performed when the battery voltage at the start of charging is high to some degree (2.5 V or more, for example), and a current value at preliminary charging that is performed when the battery voltage at the start of charging is low to some degree (less than 2.5 V, for example). The preliminary charging, here, indicates preliminary charging that is performed when returning from an overdischarged state.

Also, the temperature correction information is information used for correcting temperature information that is detected by the detection portion 64 based on the temperature detection voltage or the like from the temperature detection portion. The temperature information, in the present embodiment, is information used in battery control, and therefore is desirably information that indicates the temperature of the battery 90 itself. However, in actuality, the position where the temperature detection portion is provided is slightly apart from the battery position, and therefore the temperature of a substrate in which the temperature detection portion is provided is detected by the temperature detection portion, for example, and a temperature difference occurs between the detected temperature and the temperature of the battery 90. The temperature correction information is information for correcting this temperature difference, for example.

Note that appropriate values in the charge current information and the temperature correction information change depending on how the power receiving device 40 is mounted, what type of cell is used as the battery 90, for example, how the battery 90 and the temperature detection portion are arranged, and the like. Therefore, these pieces of information are envisioned to be programmed (written into the nonvolatile memory 62) when the power receiving device 40 is mounted. Note that the charge current information, here, and later-described charge voltage information (CV) are pieces of information that are used for controlling charging of the battery 90. That is, the nonvolatile memory 62 may store charging control information of the battery 90.

The number of charging times information is information representing the number of times that charging of the battery 90 has been performed. The number of charging times information (hereinafter also referred to as a number of cycles) is incremented at a timing when charging is started, in principle, as will be described later with reference to S3 and S5 in FIG. 20. Performance of a secondary battery is known to deteriorate (battery capacity at full charge decreases, for example) by repeating charging, and thereby monitoring of the degree of deterioration becomes possible by storing the number of charging times information.

The battery voltage is information representing a battery voltage at a given timing. For example, the battery voltage is stored when abnormal temperature of the battery (temperature is higher than an upper limit of a normal range, or lower than a lower limit of the normal range) is detected by the detection portion 64. Note that the temperature detected by the temperature detection portion is not the temperature of the battery 90 itself, as described above, and a temperature corresponding to the temperature of the battery 90 is obtained by performing correction processing. Therefore, in the specification, "temperature of the battery 90" and "abnormal temperature of the battery 90" may be used, and these terms may respectively represent a temperature based on the detection result of the temperature detection portion provided in a position that is different from the battery 90 and an abnormality detection result based on the temperature.

The temperature abnormality detection information is information representing whether or not abnormal temperature is detected. The temperature abnormality detection information may be 1-bit flag information, for example, and corresponds to a temperature error flag in FIG. 7. As is clear from this, pieces of information in FIG. 9 need not be expressed by the same number of bits. For example, 16-bit information in which a constant current value in 8-bit in normal charging and a constant current value in 8-bit in preliminary charging are combined may be stored as the charge current information, and a 16-bit ECC may be added to the 16-bit information. Also, the number of charging times information, the battery voltage, or the like may be treated as 16-bit data in which the number of charging times information, the battery voltage, or the like is expressed in 12 bits, and 4-bit data (any flag information or data fixed to 0 or 1) is added to the 12-bit data.

Note that the nonvolatile memory 62 operates with the power supply voltage based on the output voltage VCC of the power receiving portion 52, as described above. Accordingly, the nonvolatile memory 62 operates in a state in which the electronic apparatus 510 including the power receiving device 40 is placed on the charger 500 including the power transmitting device 10, as shown in A2 in FIG. 3, and does not operate in a state in which the power receiving device 40 is removed, as in A1 or A5. Since the contactless power transmission system is envisioned in the present embodiment, removal of the power receiving device 40 is likely to occur. For example, since the power receiving device 40 need not be installed to a cradle or the like, the power receiving device 40 may be freely removed by a user, or unintentionally removed as a result of an object colliding with the power transmitting device 10 or the power receiving device 40 (or a table or the like on which the devices are placed).

Accordingly, a case in which a power supply for operation is suspended during a write operation in the nonvolatile memory 62 is more likely to occur in the nonvolatile memory 62 of the present embodiment than in another general system. In such a case, a write error occurs, and information in the middle of being written into the nonvolatile memory 62 becomes unreliable.

Accordingly, in the present embodiment, when a write operation into the nonvolatile memory 62 is performed, the data may be written to different addresses with a time difference being provided. Specifically, when the status information is stored in the nonvolatile memory 62, the control portion 54, after having written the status information to a first address, writes the status information to a second address that is different from the first address after a given period has elapsed.

In this way, when a write operation of a given status information is performed, the write operation can be multiplexed by changing the write timing and a write address, and therefore the likelihood of the status information being properly written into the nonvolatile memory 62 can be improved. For example, a case is conceivable in which, even if the power receiving device 40 was removed while a write operation to one address was performed and a write error occurred, the write operation to the other address, which is performed at different timing, can be performed properly. Of course, the likelihood that the write error will occur in both of the write operations is not 0, the likelihood that the write operation is performed properly is improved compared with a case where such a method is not adopted.

For example, in the case where 32-bit data constituted by 12-bit number of charging times information, 4-bit additional information (NULL data, an aforementioned temperature error flag, or the like), and a 16-bit ECC is written as data that includes the number of charging times information, 64 bits are secured for a write region of the data including the number of charging times information. The address (start address, for example) for indicating 32 bits of the 64 bits may be the first address, and the address for indicating the next 32 bits may be the second address.

Also, the nonvolatile memory 62 may store information other than those described above, and various modifications can be implemented in the information to be stored in the nonvolatile memory 62. Also, processing for writing data in different addresses with a time difference is not limited to the processing that is performed when the status information is written, and may be performed when another piece of information (charging control information or the like) is written into the nonvolatile memory 62.

4.2 Control when Abnormal Temperature Occurs

In the case where the temperature of the battery 90 is excessively high or excessively low, the battery 90 itself may be damaged or a desired output cannot be obtained. Therefore, in the case where abnormal temperature is detected, control such that the temperature returns to a normal range (at lease the abnormal state does not progress or continue) is required. For example, in the case where the battery 90 reaches a high temperature, the power receiving device 40 suspends charging and the power transmitting device 10 also suspends power transmission in a known method. As a result of suspending charging, the battery 90 reaching a high temperature is suppressed, and the temperature is expected to return to the normal range as time elapses.

However, since charging is suspended when the temperature becomes high in the known method, the battery 90 may not be sufficiently charged. Accordingly, in the present embodiment, as described above with reference to FIG. 7, in the case where abnormal temperature is detected (E1), the power transmitting side is caused to operate intermittently during a given waiting period TOW (E2), and thereafter normal power transmission is performed and the battery 90 is charged (E4). In this way, charging can be continued even when abnormal temperature is detected, and therefore insufficient charging of the battery can be suppressed.

However, in the case where such control is performed, as shown in E5 in FIG. 7, counting of the number of cycles becomes an issue. In the waiting period TOW in FIG. 7, the power transmitting device 10 operates intermittently at appropriate intervals TR1, and therefore the start capacitor voltage does not decrease below VT, and the operation of the discharging portion 60 in the power receiving device 40 does not start. That is, even if abnormal temperature is detected and charging of the battery 90 is temporarily suspended, the period (waiting period) is short and discharging by the discharging portion 60 is not performed, and therefore influence on performance deterioration of the battery 90 is small.

That is, considering that the number of charging times information (number of cycles) is status information of the battery 90, that is, information for representing deterioration state of the battery 90 in narrow sense, even if the charging of the battery 90 is divided into multiple times as a result of interposing the waiting period TOW, it is appropriate that they should not be treated as different charging operations, and should be treated as one series (one time) of charging.

However, as will be described later with reference to FIG. 20, the number of cycles, in principle, is incremented at the start of charging. Following this principle, the number of cycles is incremented at the timing of the return from the waiting period as shown in E5 in FIG. 7. Accordingly, in the present embodiment, the temperature abnormality detection information is stored in the nonvolatile memory 62, as described above. By using the temperature abnormality detection information, appropriate counting of the number of cycles is made possible.

Note that, in the case where abnormal temperature is detected, the load modulation portion 56 transmits the temperature abnormality detection information to the power transmitting device 10 by load modulation. Accordingly, the fact of the occurrence of abnormal temperature on the power receiving side is transmitted to the power transmitting side, and thus the power transmitting device 10 can perform appropriate power transmission control (intermittent operation).

In the control portion 54, the number of charging times information in the nonvolatile memory 62 may not be updated when the temperature abnormality detection information is stored in the nonvolatile memory 62, and the number of charging times information in the nonvolatile memory 62 may be updated when the temperature abnormality detection information is not stored in the nonvolatile memory 62. In this way, the charging start upon returning from the waiting period due to temperature abnormality detection which corresponds to E5 in FIG. 7 is appropriately distinguished from other charging starts. When the temperature abnormality detection information is stored (temperature error flag=H), the charging start is a charging start upon returning from the abnormal temperature, and is not counted in the number of cycles. On the other hand, when the temperature abnormality detection information is not stored (temperature error flag=L), the charging start can be judged as a start in a normal charging state such as a state in which the power receiving device 40, which has been used by a user, is placed on the power transmitting device 10, for example, and therefore the number of cycles may be incremented following the principle.

Note that the number of cycles may not be updated properly even in the above control. Specifically, this occurs when the power receiving device 40 is removed during the waiting period. A specific example is shown in FIG. 10.

Figure 10:
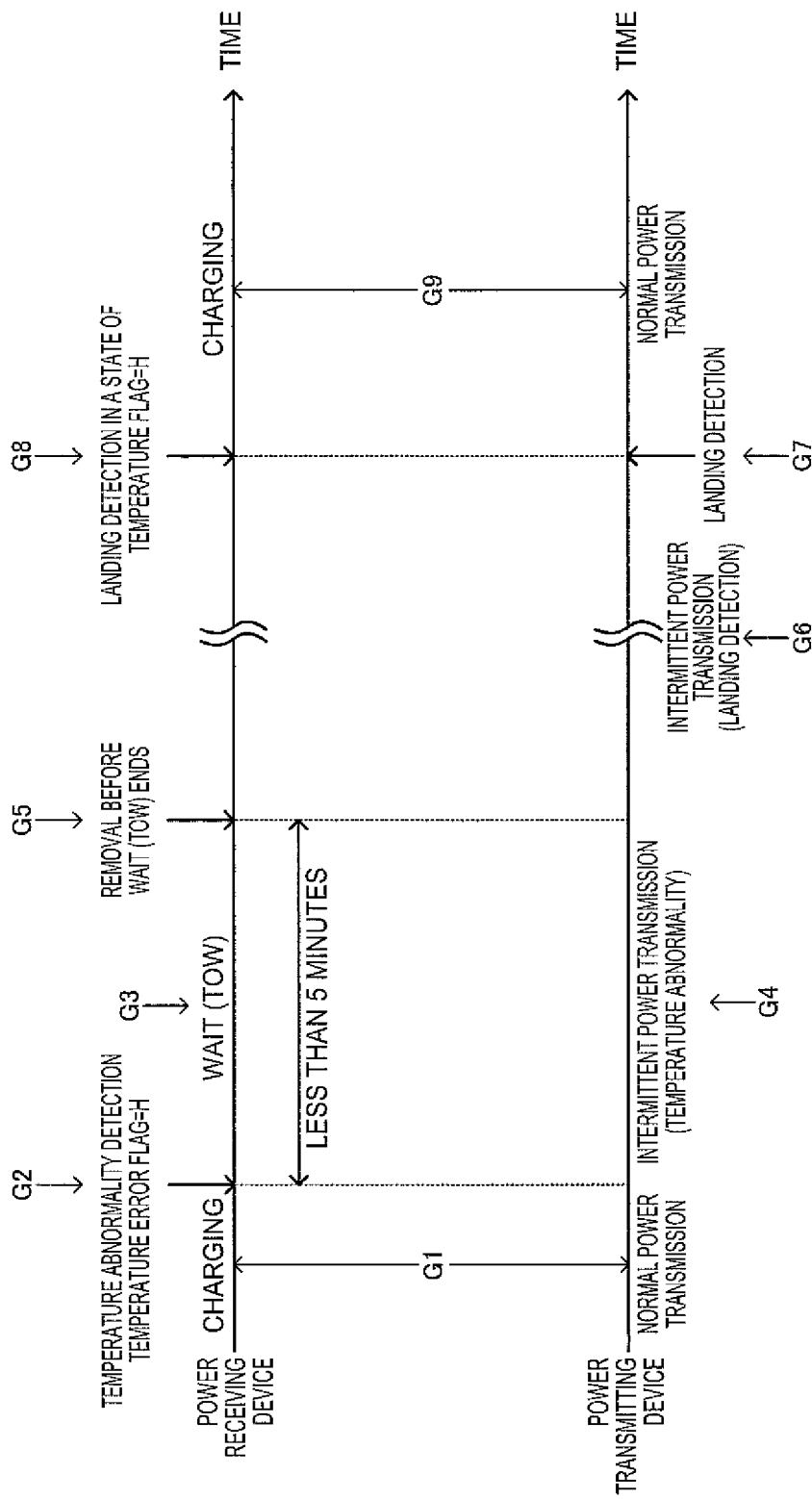
FIG. 10 is a diagram for illustrating the operation sequence of the present embodiment.

The horizontal direction in FIG. 10 indicates the time, and FIG. 10 is a diagram illustrating an example of an operation sequence of the power transmitting device 10 and the power receiving device 40. First, when abnormal temperature is not detected, as indicated by G1, the power transmitting device 10 performs normal power transmission and charging of the battery 90 is performed in the power receiving device 40. In contrast, when abnormal temperature is detected as indicated by G2, in the power receiving device 40, the temperature abnormality detection information is written into the nonvolatile memory 62 (temperature error flag=H) and charging is suspended, and the power receiving device 40 enters the waiting period as indicated by G3. On the other hand, the temperature abnormality detection information is also transmitted to the power transmitting device 10, and the power transmitting device 10 starts intermittent power transmission for abnormal temperature as indicated by G4. The intermittent power transmission for abnormal temperature may be similar to the intermittent power transmission for removal detection.

Here, assume that the power receiving device 40 is removed before the waiting period ends (before 5 minutes has elapsed, for example) as indicated by G5. In this case, similarly to the process shown in FIG. 5 or the like, in the power receiving device 40, after the start-up period (TST) has elapsed since the output voltage VCC of the power receiving portion 52 decreased below the judgement threshold (3.1 V), the discharging operation of the discharging portion 60 is started. Also, as indicated by G6, in the power transmitting device 10, intermittent power transmission for landing detection is started.

Whether or not the number of cycles should be updated becoming an issue is a case where the power receiving device 40 is removed before the waiting period ends as indicated by G5, and thereafter the landing detection is performed as indicated by G7. In this case, the temperature abnormality detection information that was written at G2 is held in the nonvolatile memory 62 of the power receiving device 40 as indicated by G8 (the state in which temperature error flag=H is maintained). Therefore, when the above control is performed, the number of cycles is not updated in the judgement at G8.

In the case where the consumption of the battery 90 in a period from when the electronic apparatus 510 including the power receiving device 40 was removed during the waiting period until when the apparatus is again placed on the charger 500 including the power transmitting device 10 (a period between G5 and G8 in FIG. 10) is small, the deterioration of the battery 90 in the period is not much. That is, similar to the battery charging operations before and after the waiting period TOW being considered to be one series of charging as described above, the charging (charging at G9) in this case can also be considered to be in one series of charging of the charging (charging at G1) before removal. Therefore, there is no problem in that the number of cycles is judged to be not updated in G8.

However, in the case where the battery 90 is sufficiently used after removal during the waiting period, that is, discharging is performed similarly to the normal operation, deterioration of the battery 90 due to the discharging should be considered, and if charging is started thereafter, the charging needs to be considered to be charging separate from the charging before removal. That is, in the judgement in G8, the number of cycles needs to be incremented, and it is inappropriate that the number of cycles is not updated because the temperature abnormality detection information is written into the nonvolatile memory 62.

Accordingly, in the present embodiment, the battery voltage when abnormal temperature is detected is stored in the nonvolatile memory 62 as described above. How much of the battery 90 was consumed is judged by performing processing for comparing the battery voltage VBAT at the time of charging start and the battery voltage stored in the nonvolatile memory 62. Specifically, in the case where the battery voltage VBAT decreases below the battery voltage stored in the nonvolatile memory 62 by a predetermined voltage, the control portion 54 updates, even in a case where the temperature abnormality detection information is stored in the nonvolatile memory 62, the number of charging times information in the nonvolatile memory 62. The predetermined voltage here may be set in various ways, and is 0.15 V, for example.

In this way, even in a case where removal is performed during the waiting period, the number of cycles can be appropriately counted. The battery voltage stored in the nonvolatile memory 62 is the battery voltage when temperature abnormality is detected, and can be considered to be equivalent to the battery voltage when removal is performed. That is, the case where the battery voltage VBAT at charging start is below the battery voltage stored in the nonvolatile memory 62 by the predetermined voltage corresponds to a case where the battery 90 has discharged to some degree after removal. That is, counting of the number of cycles according to the usage condition of the battery 90 after removal is made possible by performing the above control.

Figure 11A:
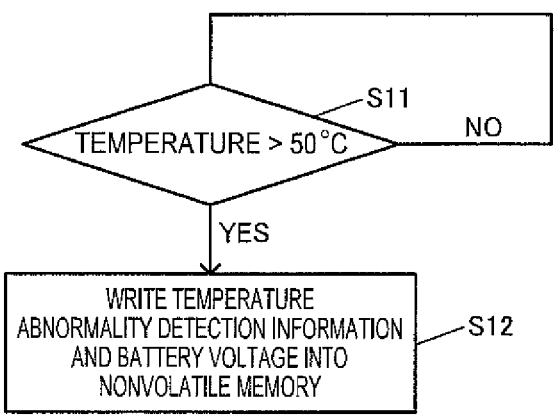
FIGS. 11A and 11B are flowcharts for describing a control flow relating to abnormal temperature.
Figure 11B:
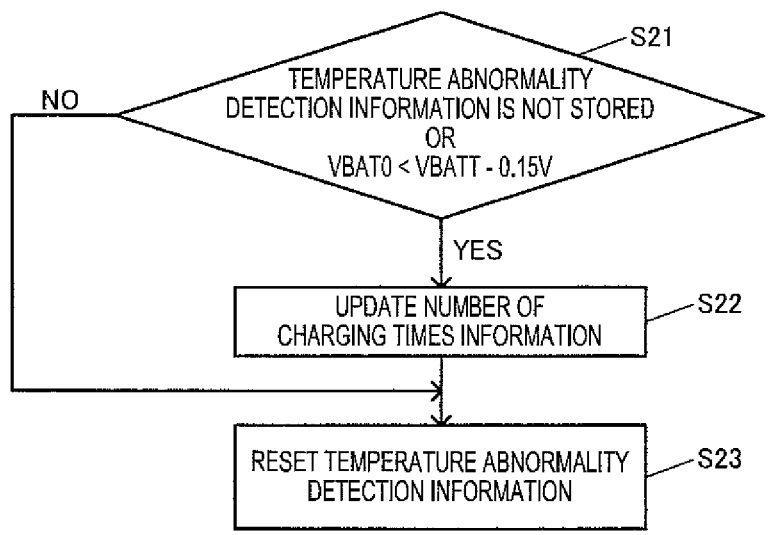

FIGS. 11A and 11B are flowcharts for describing the above control. FIG. 11A shows an abnormal temperature detection operation that is performed regularly, and the control portion 54 judges at given intervals whether or not the temperature is abnormal, that is, whether or not the temperature exceeds 50° C. in the example in FIG. 11A (S11). If No in S11, since abnormal temperature is not detected, the step returns to S11 without performing any specific processing. On the other hand, if Yes in S11, since abnormal temperature is detected, the temperature abnormality detection information is written into the nonvolatile memory 62 (set temperature error flag=H) and the battery voltage at the time is written as well (S12).

FIG. 11B is a flowchart for describing the count control of the number of cycles at charging start. In S5 in later described FIG. 20, the number of cycles is always incremented in order to simplify the description, but in actuality, the step S5 in FIG. 20 may be replaced by the flowchart in FIG. 11B.

In the control of the number of cycles, whether or not incrementation of the number of cycles is needed is judged first. In the case where the temperature abnormality detection information is not stored in the nonvolatile memory 62, the processing may be performed following the principle, and therefore incrementation can be judged to be needed. If the battery voltage has decreased even if the temperature abnormality detection information is stored, incrementation is needed. That is, the above condition is to judge whether or not the logical expression (temperature abnormality detection information is not stored) OR (VBAT0<VBATT−0.15) is satisfied (S21). Here, VBAT0 is the battery voltage when charging is started, and VBATT is the battery voltage that is written in S12 in FIG. 11A when the temperature abnormality is detected.

If Yes in S21, the number of cycles is incremented (S22). On the other hand, if No in S21, the number of cycles is not updated. Also, in either of the cases, the temperature error flag is reset in preparation for the following processing (S23).

Note that the detection portion 64 performs the temperature detection (temperature abnormality detection) based on a signal from the temperature detection portion, as described above. The temperature detection portion in the present embodiment can be realized in various modes. For example, a temperature detection portion (thermistor TH) external to the control device 50 may be used, which will be described later with reference to FIG. 21. Specifically, the detection portion 64 may perform the temperature detection by supplying a given constant current IREF to the thermistor TH, and A/D converting a value of the voltage that is generated by the constant current IREF with the A/D converter circuit 65. Note that the number of values of IREF need not to be one, and different values of IREF may be used in a high temperature region and in a low temperature region, for example.

Alternatively, the control device 50 may include a BGR circuit (Band Gap Reference circuit), and may perform the temperature detection based on the output of the BGR circuit. Note that the configuration of the temperature detection portion using a band gap is widely known, and therefore a detailed description will be omitted.

Also, although not shown in FIG. 9, setting information for setting whether an external thermistor TH is to be used or the BGR circuit is to be used as the temperature detection portion may be stored in the nonvolatile memory 62 of the present embodiment. Also, correction information for the thermistor TH and correction information for the BGR circuit may be stored as the temperature correction information.

4.3 Smart Charging

Also, control based on the information stored in the nonvolatile memory 62 is not limited to the above example of the abnormal temperature. For example, information stored in the nonvolatile memory 62 may be referred to when smart charging disclosed in US-A1-2014-0320089 is performed.

Figure 2:
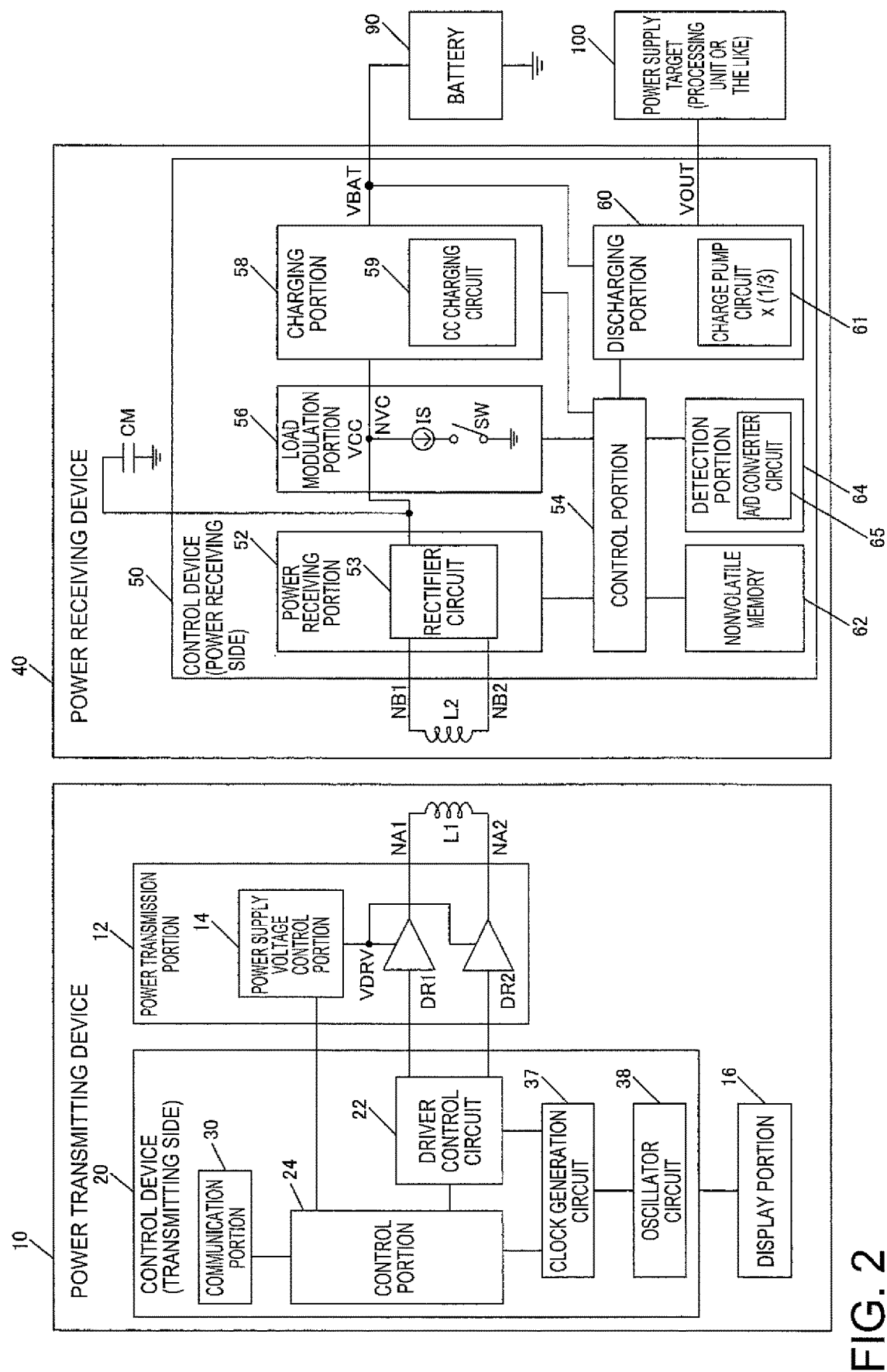
FIG. 2 illustrates an exemplary configuration of a power transmitting device, a power receiving device, and control devices on a power transmitting side and a power receiving side of the present embodiment.

As shown in FIG. 1 in US-A1-2014-0320089 (Prior Art), the relationship between the charge voltage, the battery voltage (charging power) at full charge, and the number of cycles has been known prior to US-A1-2014-0320089 is applied. As can be understood from FIG. 1, if the charge voltage is increased, the charging power increases, and thereby the battery capacity can be used effectively, but the number of cycles decreases. Note that the number of cycles here is information representing the number of charging times with which chargeable capacity of the battery decreases to a predetermined ratio (90%, for example) relative to the original capacity.

An algorithm is proposed in US-A1-2014-0320089 with which a battery (lithium ion cell) is effectively used assuming the relationship in FIG. 1. A specific method is shown in FIG. 3, and in the case where the battery voltage is from 3.22 V to 3.5 V when charging is started, the charge voltage of when the previous charging was performed is maintained. On the other hand, in the case where the battery voltage is 3.5 V or more, the charge voltage is lowered compared with the charge voltage at the previous charging, and in the case where the battery voltage is 3.22 V or less, the charge voltage is increased compared with the charge voltage at the previous charging.

In the case where the battery voltage is 3.22 V or less at charging, it is assumed that the target apparatus has been used often. That is, the battery 90 is assumed to have been consumed extensively, and therefore the charge voltage is increased and the charging power to the battery capacity is increased so as to not be charged insufficiently.

On the other hand, in the case where the battery voltage is 3.5 V or more at charging, it is assumed that the target apparatus has not been used often. That is, the battery 90 is assumed to have not been consumed extensively, and therefore the charge voltage is lowered so as to suppress deterioration of the battery.

That is, as shown in FIG. 1, the charging power to the battery capacity and the degree of deterioration of the battery are in a trade-off relationship, and the smart charging in US-A1-2014-0320089 can be said to be a method in which an appropriate charge voltage is set according to the actual usage condition of the battery.

The nonvolatile memory 62 of the present embodiment may store the charge voltage in charging control, which is not shown in FIG. 9, and the control portion 54 may perform the charging control based on the stored charge voltage.

Figure 12:
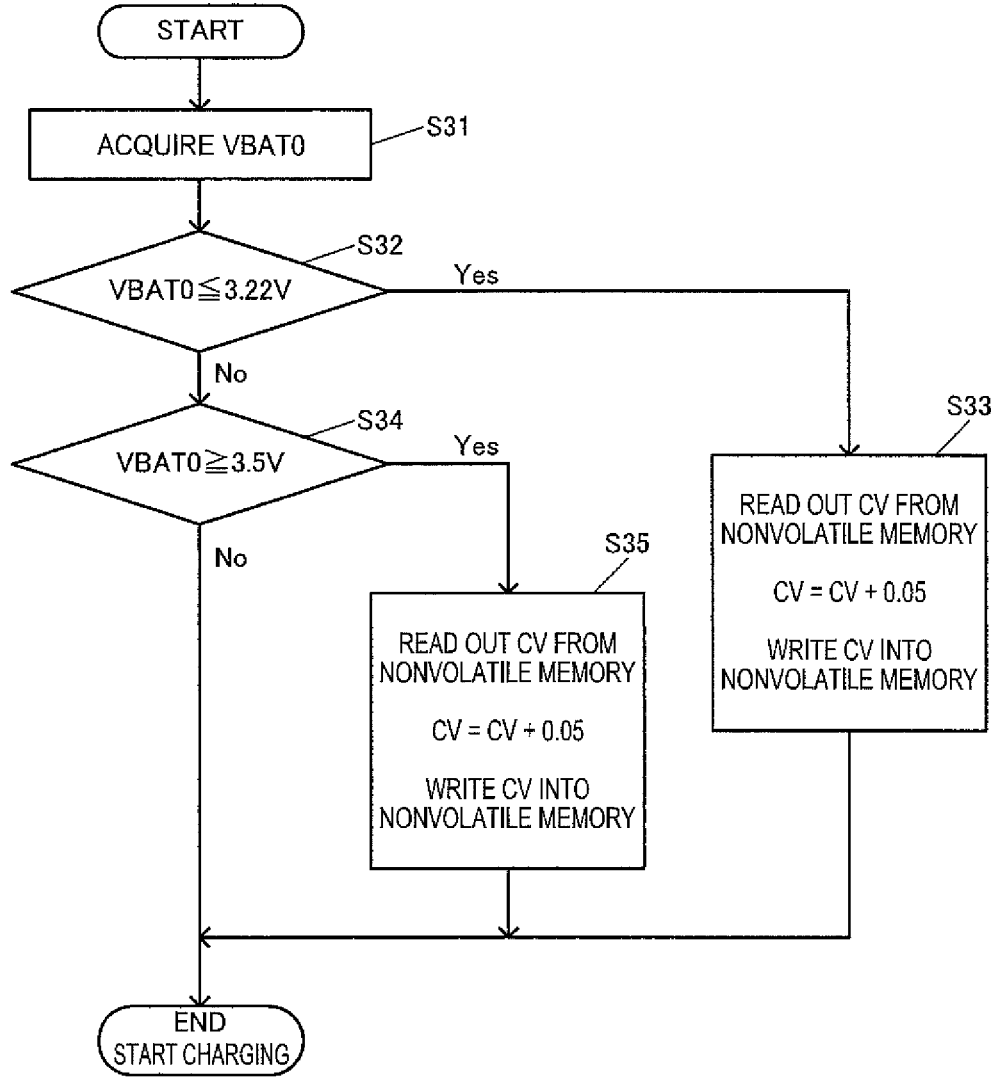
FIG. 12 is a flowchart for describing a flow of smart charging.

A flowchart for describing a specific processing flow is shown in FIG. 12. When the processing is started, first, the battery voltage VBAT0 when charging was started is obtained (S31). Then, it is judged whether VBAT0 is 3.22 V or less or not (S32). If Yes in S32, the target battery 90 can be considered to be often used, and therefore the charge voltage is increased so as to make sufficient use of the battery capacity (so as to increase power to be charged). Specifically, update processing is performed in which the previous charge voltage CV is read out from the nonvolatile memory 62 and the charge voltage CV is increased by a predetermined voltage (0.05V) (S33). Then, the updated voltage value CV is stored in the nonvolatile memory 62. The stored updated CV is to be used when subsequent charging is started. Note that, in the processing in S33, an upper limit may be provided to the charge voltage after update such that the charge voltage does not become excessively high, and the maximum value of CV may be set to 4.20 V, for example.

On the other hand, if No in S32, it is judged whether or not VBAT0 is 3.5V or more (S34). If Yes in S34, the target battery 90 is considered to not be used often, and therefore the charge voltage is lowered. Specifically, update processing is performed in which the previous charge voltage CV is read out from the nonvolatile memory 62, and the charge voltage CV is lowered by a predetermined voltage (0.05V) (S35). In this case as well, the updated voltage value CV is stored in the nonvolatile memory 62. Note that in the processing in S35, a lower limit may be provided to the updated charge voltage such that the charge voltage does not become excessively low, and the minimum value of CV may be set to 4.00 V (or 4.05V), for example.

Also, if No in S34, the usage condition of the battery 90 is in an intermediate state, and it is judged to be no problem if charging similar to the previous charging is performed. Therefore, update processing of CV is not performed, and the processing is ended. After the processing in FIG. 12, charging of the battery 90 may be performed using the set charge voltage CV. Note that the thresholds 3.22 V and 3.50 V for judging the usage condition of the battery 90 and the limit values 4.20 V and 4.00 V are not limited to thereto, and various modifications can be implemented.

As described above, the method of the present embodiment can be applied to the receiving side control device 50 in the contactless power transmission system including the power transmitting device 10 and the power receiving device 40. The control device 50 includes the charging portion 58 that charges the battery 90 based on the power received by the power receiving portion 52 that receives power from the power transmitting device 10, the control portion 54 that performs charging control, and the nonvolatile memory 62. The nonvolatile memory 62 stores the status information of the battery, and the control portion 54 performs charging control based on the status information stored in the nonvolatile memory 62.

In this way, as in the aforementioned control when temperature abnormality is detected, for example, appropriate charging control based on the status of the battery 90 can be realized.

Also, the method of the present embodiment can be applied to the transmitting side control device 20 in the contactless power transmission system including the power transmitting device 10 and the power receiving device 40. The control device 20 includes the driver control circuit 22 that controls the power transmission drivers (DR1 and DR2) in the power transmission portion 12 that transmits power to the power receiving device 40, the control portion 24 that drives the driver control circuit 22, and the communication portion 30 that performs communication processing with the power receiving device 40 that transmits communication data by load modulation. The control portion 24 causes the power transmission portion 12 to perform intermittent power transmission upon receiving the communication data including temperature abnormality detection information from the power receiving device 40. Specifically, the control portion 24 may cause the driver control circuit 22 to execute control for performing intermittent power transmission.

In this way, detection of abnormal temperature on the power receiving side can be transmitted to the power transmitting side, and thereby appropriate execution of the power transmission control (control for causing intermittent power transmission to be performed) that is required when temperature abnormality is detected becomes possible.

Also, the method of the present embodiment can be applied to an electronic apparatus that includes the control device 50 or the control device 20. The electronic apparatus 510 including the control device 50 can be considered in various modes including the hearing aid and the like as described above. The electronic apparatus including the control device 20 is the charger 500 described above or the like.

Also, the method of the present embodiment can be applied to the contactless power transmission system including the power transmitting device 10 and the power receiving device 40 as described above. The power transmitting device 10 transmits power to the power receiving device 40, and performs communication processing with the power receiving device 40 that transmits communication data by load modulation. The power receiving device 40 includes the nonvolatile memory 62 that stores status information of the battery 90, charges the battery 90 based on the power received from the power transmitting device 10 and the status information stored in the nonvolatile memory 62, and transmits communication data to the power transmitting device 10 by load modulation. Also, the power receiving device 40, in the case where abnormal temperature is detected, stores temperature abnormality detection information in the nonvolatile memory 62 as the status information, and transmits the temperature abnormality detection information to the power transmitting device 10 by load modulation. The power transmitting device 10, upon receiving the communication data including the temperature abnormality detection information from the power receiving device 40, transmits power to the power receiving device 40 by intermittent power transmission.

5. Communication Method

Figure 13:
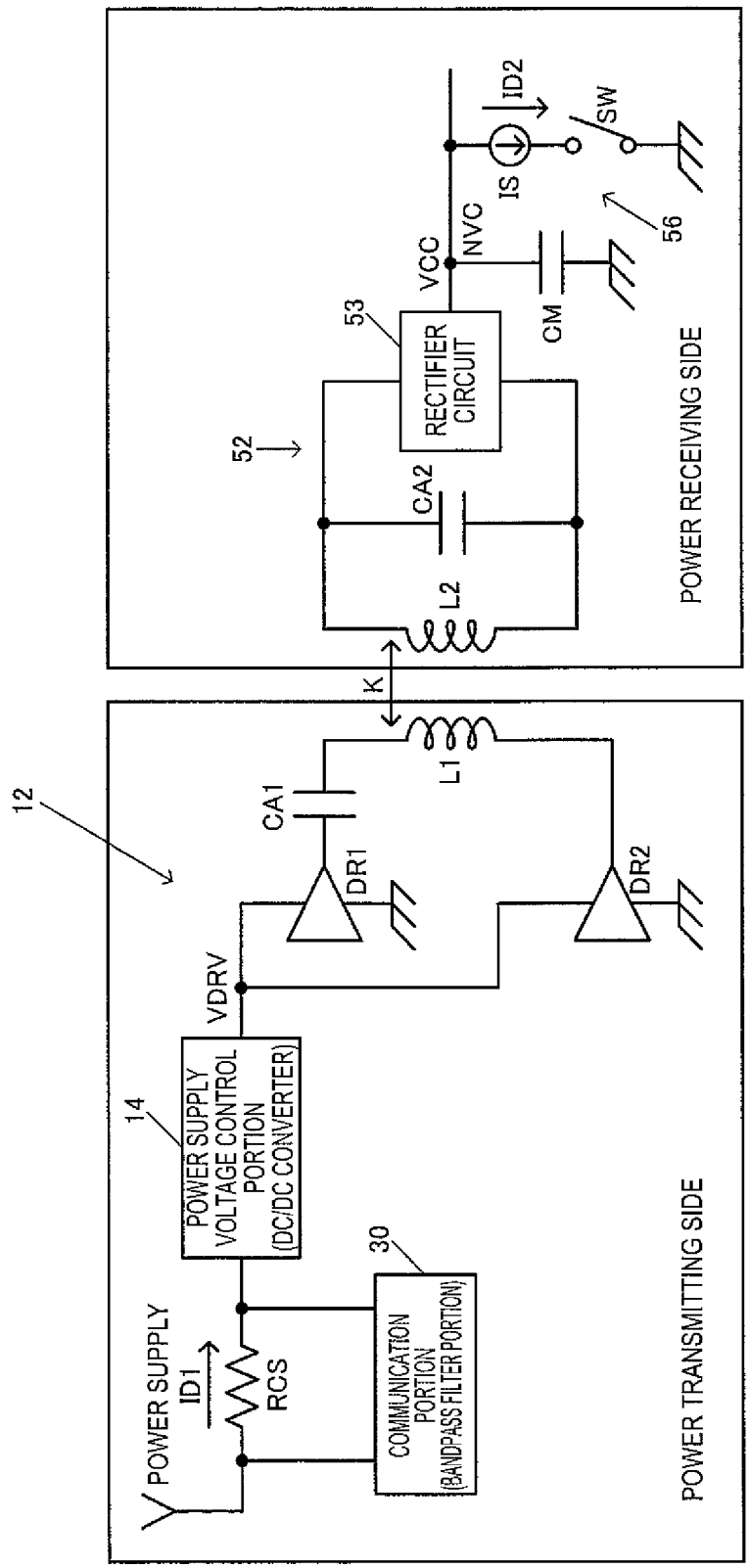
FIG. 13 is a diagram for describing a method of communication by load modulation.

FIG. 13 is a diagram for describing an example of the method of communication by load modulation. The power transmission drivers DR1 and DR2 in the power transmission portion 12 drive the primary coil L1 on the power transmitting side (primary side), as shown in FIG. 13. Specifically, the power transmission drivers DR1 and DR2 operate based on the power supply voltage VDRV supplied from the power supply voltage control portion 14 and drive the primary coil L1.

On the other hand, on the power receiving side (secondary side), the coil end voltage of the secondary coil L2 is rectified by the rectifier circuit 53 in the power receiving portion 52, and a rectified voltage VCC is output to the node NVC. Note that the primary coil L1 and a capacitor CA1 constitute a resonance circuit on the power transmitting side, and the secondary coil L2 and the capacitor CA2 constitute a resonance circuit on the power receiving side.

On the power receiving side, a current ID2 of the current source IS is caused to intermittently flow from the node NVC to the GND side by turning on and off the switching element SW in the load modulation portion 56, and thereby the load state on the power receiving side (power receiving side voltage) is changed.

On the power transmitting side, a current ID1 that flows in a sense resistor RCS provided in a power supply line changes due to the change of the load state on the power receiving side caused by load modulation. For example, the sense resistor RCS for detecting the current that flows in a power supply is provided between the power supply (power supply device such as the power supply adapter 502 shown in FIG. 1A, for example) on the power transmitting side and the power supply voltage control portion 14. A power supply voltage is supplied from the power supply to the power supply voltage control portion 14 via the sense resistor RCS. A current ID1 that flows from the power supply to the sense resistor RCS changes due to the change of the load state on the power receiving side caused by load modulation, and the communication portion 30 detects the change in the current. Then, the communication portion 30 performs a detection operation for detecting communication data that is transmitted by load modulation based on the detection result.

Figure 14:
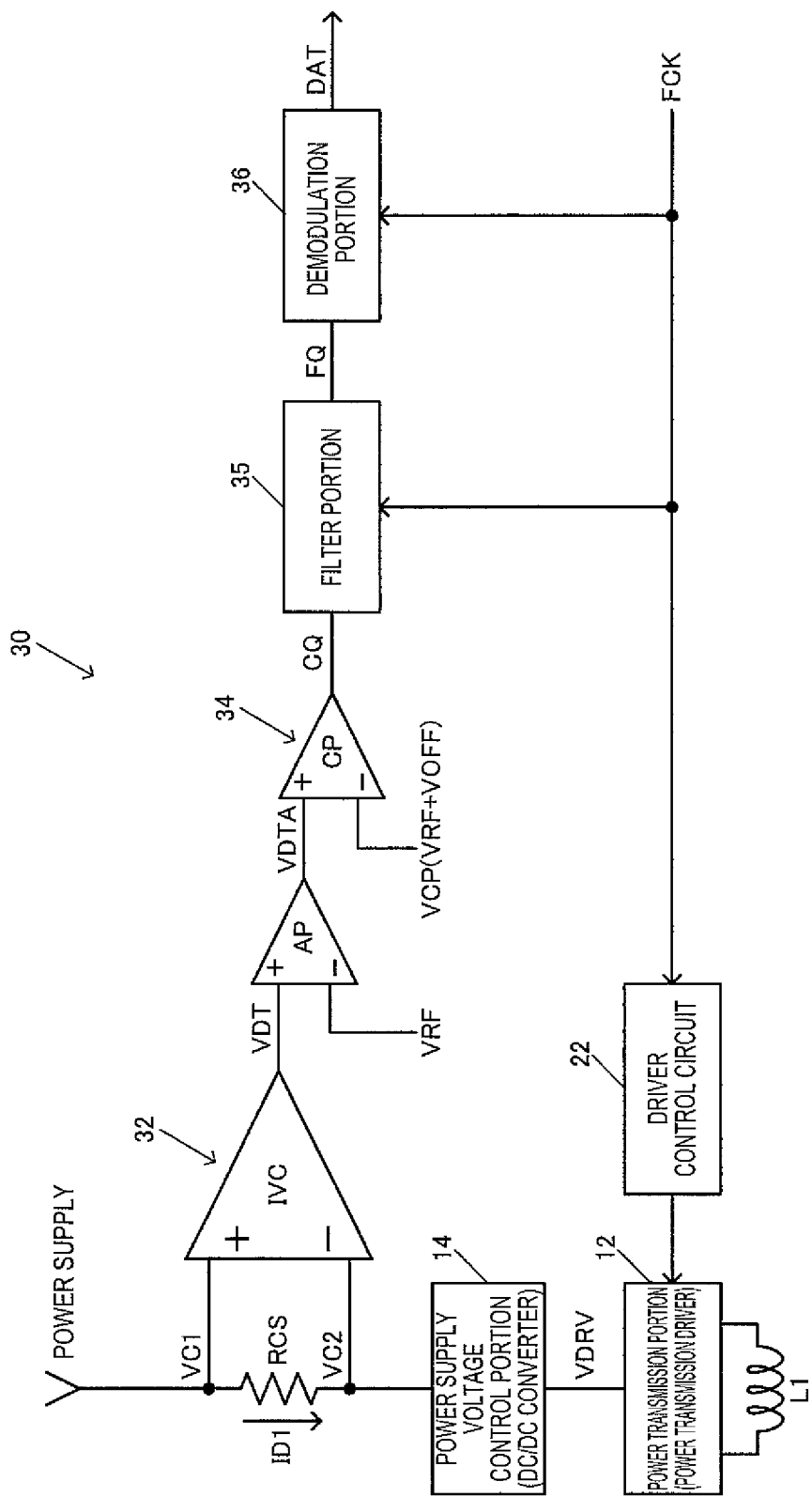
FIG. 14 illustrates an exemplary configuration of a communication portion.

An example of the specific configuration of the communication portion 30 is shown in FIG. 14. The communication portion 30 includes a current detection circuit 32, a comparator circuit 34, and a demodulation portion 36, as shown in FIG. 14. Also, the communication portion 30 can include an amplifier AP for signal amplification and a filter portion 35. Note that the communication portion 30 is not limited to the configuration in FIG. 14, and various modifications can be implemented such as omitting a portion of the constituent elements, adding another constituent element (bandpass filter portion, for example), or changing connection relationships.

The current detection circuit 32 detects the current ID1 that flows from the power supply (power supply device) to the power transmission portion 12. Specifically, the current detection circuit 32 detects the current ID1 that flows from the power supply to the power transmission portion 12 via the power supply voltage control portion 14. The current ID1 may include a current that flows in the driver control circuit 22 and the like, for example.

In FIG. 14, the current detection circuit 32 is constituted by an IV conversion amplifier IVC. A non-inverting input terminal (+) of the IV conversion amplifier IVC is connected to one end of the sense resistor RCS, and an inverting input terminal (−) thereof is connected to the other end of the sense resistor RCS. The IV conversion amplifier IVC amplifies a minute voltage VC1-VC2 that is generated by the minute current ID1 that flows in the sense resistor RCS, and outputs the amplified voltage as the detection voltage VDT. The detection voltage VDT from the bandpass filter portion 33 is further amplified by the amplifier AP, and the amplified voltage is output to the comparator circuit 34 as a detection voltage VDTA. Specifically, the detection voltage VDT is input to a non-inverting input terminal of the amplifier AP, and a reference voltage VRF is input to an inverting input terminal thereof, and the amplifier AP outputs the detection voltage VDTA signal that has been amplified with reference to the reference voltage VRF.

The comparator circuit 34 compares the detection voltage VDTA by the current detection circuit 32 with a judgement voltage VCP=VRF+VOFF. Then, the comparator circuit 34 outputs a comparison result CQ. For example, the comparator circuit 34 performs comparison to judge whether the detection voltage VDTA exceeds the judgement voltage VCP or is lower than the judgement voltage VCP. The comparator circuit 34 can be constituted by a comparator CP, for example. In this case, the voltage VOFF of the judgement voltage VCP=VRF+VOFF may be realized by an offset voltage of the comparator CP, or the like.

The demodulation portion 36 determines a load modulation pattern based on the comparison result CQ (comparison result FQ after filtering processing) of the comparator circuit 34. That is, communication data is detected by performing demodulation processing with the load modulation pattern, and is output as detection data DAT. The control portion 24 on the power transmitting side performs various types of processing based on the detection data DAT.

Note that, in FIG. 14, the filter portion 35 is provided between the comparator circuit 34 and the demodulation portion 36. The demodulation portion 36 determines the load modulation pattern based on the comparison result FQ after filtering processing by the filter portion 35. Although a digital filter (FIR) or the like can be used as the filter portion 35, for example, a passive filter may be used as the filter portion 35. By providing the filter portion 35, adverse effects from noise in later-described F1 and F2 in FIG. 16, for example, can be reduced.

The filter portion 35 and the demodulation portion 36 operate with receiving a drive clock signal FCK, for example. The drive clock signal FCK is a signal for defining a power transmission frequency, and the driver control circuit 22 drives the power transmission drivers DR1 and DR2 in the power transmission portion 12 with receiving the drive clock signal FCK. The primary coil L1 is driven with a frequency (power transmission frequency) defined by the drive clock signal FCK.

Note that a bandpass filter portion that performs bandpass filtering processing in which a signal in a load modulation frequency band is allowed to pass, and signals in bands other than the load modulation frequency band are attenuated may be provided in the communication portion 30. In this case, the communication portion 30 detects communication data from the power receiving device 40 based on the output of the bandpass filter portion. Specifically, the bandpass filter portion performs bandpass filtering processing on the detection voltage VDT of the current detection circuit 32. The comparator circuit 34 compares the detection voltage VDTA after bandpass filtering processing by the bandpass filter portion and the judgement voltage VCP. The bandpass filter portion may be provided between the IV conversion amplifier IVC and the amplifier AP.

Figure 15:
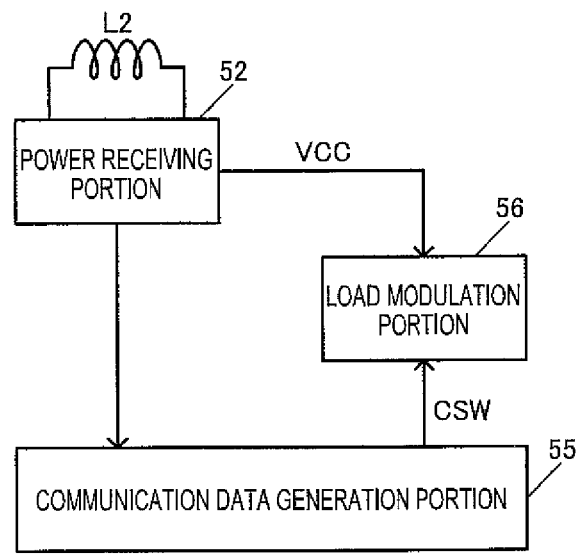
FIG. 15 is a diagram for describing a communication configuration on the power receiving side.

FIG. 15 is a diagram for describing a communication configuration on the power receiving side, for example. The power receiving portion 52 extracts a clock signal having a frequency corresponding to the drive clock signal FCK, and supplies the extracted signal to the communication data generation portion 55. The communication data generation portion 55 is provided in the control portion 54 in FIG. 2, and performs processing for generating communication data based on the supplied clock signal. The communication data generation portion 55 outputs a control signal CSW for transmitting the generated communication data to the load modulation portion 56, and causes the load modulation portion 56 to perform load modulation corresponding to the communication data by performing turning on and off the switching element SW, for example, with the control signal CSW.

The load modulation portion 56 performs load modulation by changing the load state (load due to load modulation) on the power receiving side to states such as a first load state and a second load state, for example. The first load state is a state in which the switching element SW is turned on, for example, and is a state in which the load state (load in load modulation) on the power receiving side is a high load (low impedance). The second load state is a state in which the switching element SW is turned off, for example, and is a state in which the load state (load in load modulation) on the power receiving side is a low load (high impedance).

In the load modulation method so far, communication data is transmitted from the power receiving side to the power transmitting side by associating the first load state with a logic level "1" (first logic level) of the communication data and associating the second load state with a logic level "0" (second logic level) of the communication data. That is, communication data having a predetermined number of bits has been transmitted by turning on the switching element SW if the logic level of a bit in the communication data is "1", and by turning off the switching element SW if the logic level of the bit in the communication data is "0".

However, in an application in which the coupling degree between the coils is small, the coils are small, or transmitting power is also small, for example, realization of adequate communication is difficult with such a known load modulation method. That is, even if the load state of the power receiving side is changed by load modulation to the states such as the first load state and the second load state, data detection error in logic levels "1" and "0" in the communication data occurs due to noise. That is, even if load modulation is performed on the power receiving side, the current ID1 that flows in the sense resistor RCS on the power transmitting side due to this load modulation becomes a very minute current. Therefore, if noise is superimposed, a data detection error occurs, and a communication error due to noise or the like occurs.

Figure 16:
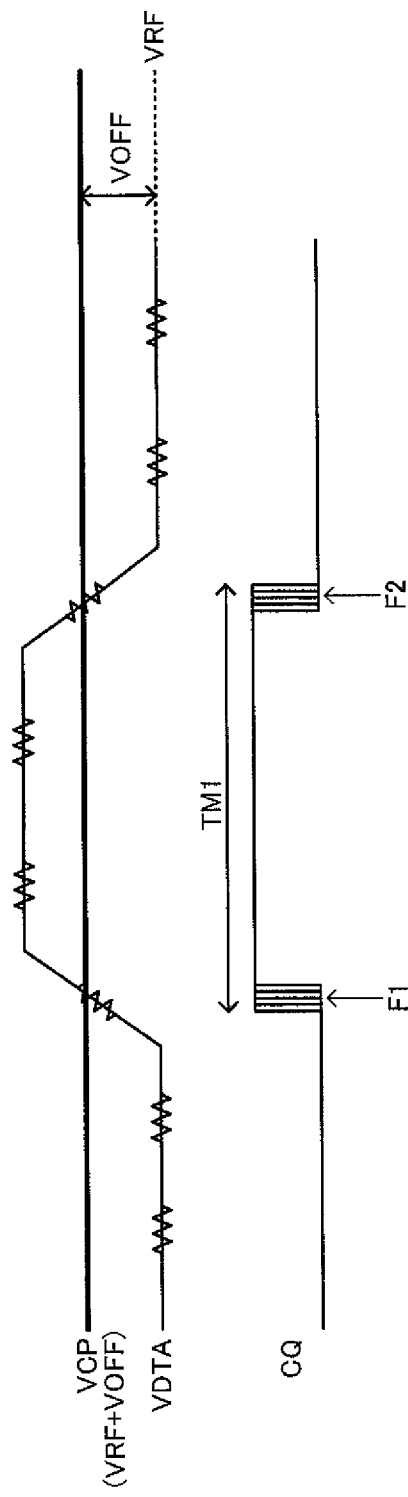
FIG. 16 is a diagram for describing a problem caused by noise in communication.

For example, FIG. 16 is a diagram schematically illustrating signal waveforms of the detection voltage VDTA, the judgement voltage VCP and the comparison judgement result CQ of the comparator circuit 34. As shown in FIG. 16, the detection voltage VDTA is a voltage signal that changes relative to the reference voltage VRF, and the judgement voltage VCP is a voltage signal in which the offset voltage VOFF of the comparator CP is added to the reference voltage VRF.

As shown in FIG. 16, when noise is superimposed on the detection voltage VDTA signal, for example, edge positions of the comparison result CQ signal change as illustrated in F1 and F2, and the width (interval) of a period TM1 changes so as to increase or decrease. For example, assuming that the period TM1 is a period corresponding to the logic level "1", if the width of the period TM1 changes, a sampling error of the communication data occurs, and a communication data detection error occurs. Specifically, in the case where communication is performed by regular load modulation in a normal power transmission period, an amount of noise that is superimposed on the communication data may be increased, and the probability of occurrence of the communication data detection error increases.

In the present embodiment, a method is adopted in which the logic level "1" (data 1) or the logic level "0" (data 0) of each bit in the communication data is transmitted from the power receiving side using a load modulation pattern, and is detected on the power transmitting side.

Figure 17A:
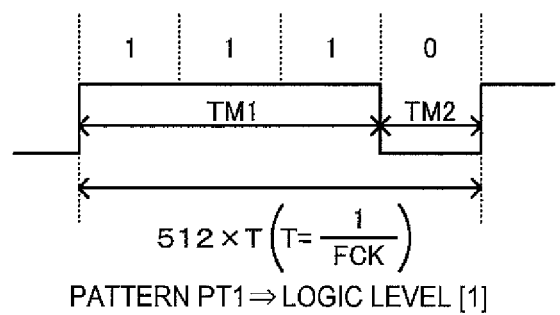
FIGS. 17A and 17B is a diagram for describing a communication method of the present embodiment.
Figure 17B:
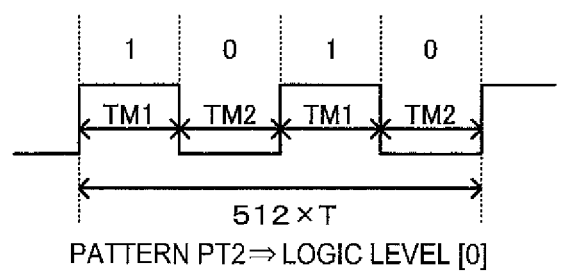

Specifically, as shown in FIGS. 17A and 17B, the load modulation portion 56 on the power receiving side performs load modulation such that the load modulation pattern is a first pattern PT1 for a first logic level "1" of the communication data that is transmitted to the power transmitting device 10. On the other hand, the load modulation portion 56 on the power receiving side performs load modulation such that the load modulation pattern is a second pattern PT2 that is different from the first pattern PT1 for a second logic level "0" of the communication data.

The communication portion 30 (demodulation portion) on the power transmitting side determines that the communication data is communication data of the first logic level "1" if the load modulation pattern is the first pattern PT1. On the other hand, the communication portion 30 determines that the communication data is communication data of the second logic level "0" if the load modulation pattern is the second pattern PT2 that is different from the first pattern PT1.

Here, the load modulation pattern is a pattern constituted by the first load state and the second load state. The first load state is a state in which the load on the power receiving side set by the load modulation portion 56 is a high load, for example. Specifically, in FIGS. 17A and 17B, a period TM1 in the first load state is a period in which the switching element SW in the load modulation portion 56 is turned on and current of the current source IS flows from the node NVC to the GND side, and is a period corresponding to a high level (bit=1) in the first and second patterns PT1 and PT2.

On the other hand, the second load state is a state where the load on the power receiving side set by the load modulation portion 56 is a low load, for example. Specifically, in FIGS. 17A and 17B, a period TM2 in the second load state is a period in which the switching element SW in the load modulation portion 56 is turned off, and is a period corresponding to a low level (bit=0) in the first and second patterns PT1 and PT2.

In FIGS. 17A and 17B, the first pattern PT1 is a pattern in which the width of period TM1 in the first load state is longer than that in the second pattern PT2. The first pattern PT1 in which the width of period TM1 in the first load state is longer than that in the second pattern PT2 is determined to be the logic level "1". On the other hand, the second pattern PT2 in which the width of period TM1 in the first load state is shorter than that in the first pattern PT1 is determined to be the logic level "0".

As shown in FIG. 17A, the first pattern PT1 is a pattern corresponding to a bit pattern (1110), for example. As shown in FIG. 17B, the second pattern PT2 is a pattern corresponding to a bit pattern (1010), for example. In these bit patterns, bit=1 corresponds to a state in which the switching element SW in the load modulation portion 56 is turned on, and bit=0 corresponds to a state in which the switching element SW in the load modulation portion 56 is turned off.

For example, in the case where the bit in transmitting communication data is a logic level "1", the switching element SW in the load modulation portion 56 is turned on and off, on the power receiving side, with a bit pattern (1110) that corresponds to the first pattern PT1. Specifically, switching control in which the switching element SW is sequentially turned on, on, on, and off is performed. Then, in the case where the load modulation pattern is the first pattern PT1 that corresponds to the bit pattern (1110), the logic level of the bit in the communication data is determined, on the power transmitting side, to be "1".

On the other hand, in the case where the bit in transmitting communication data is a logic level "0", the switching element SW in the load modulation portion 56 is turned on and off, on the power receiving side, with a bit pattern (1010) that corresponds to the second pattern PT2. Specifically, switching control in which the switching element SW is sequentially turns on, off, on, and off is performed. Then, in the case where the load modulation pattern is the second pattern PT2 that corresponds to the bit pattern (1010), the logic level of the bit in the communication data is determined, on the power transmitting side, to be "0".

Here, in the case where the drive frequency in the power transmission portion 12 is FCK, and the drive cycle is T=1/FCK, the length of each of the first and second patterns PT1 and PT2 is expressed as 512×T, for example. In this case, the length of one bit section can be expressed as (512×T)/4=128×T. Accordingly, in the case where the bit in the communication data is in a logic level "1", the switching element SW in the load modulation portion 56 is turned on and off, on the power receiving side, in the bit pattern (1110) that corresponds to the first pattern PT1 in an interval 128×T, for example. Also, in the case where the bit in the communication data is in a logic level "0", the switching element SW in the load modulation portion 56 is turned on and off, on the power receiving side, in the bit pattern (1010) that corresponds to the second pattern PT2 in the interval 128×T, for example.

Figure 18:
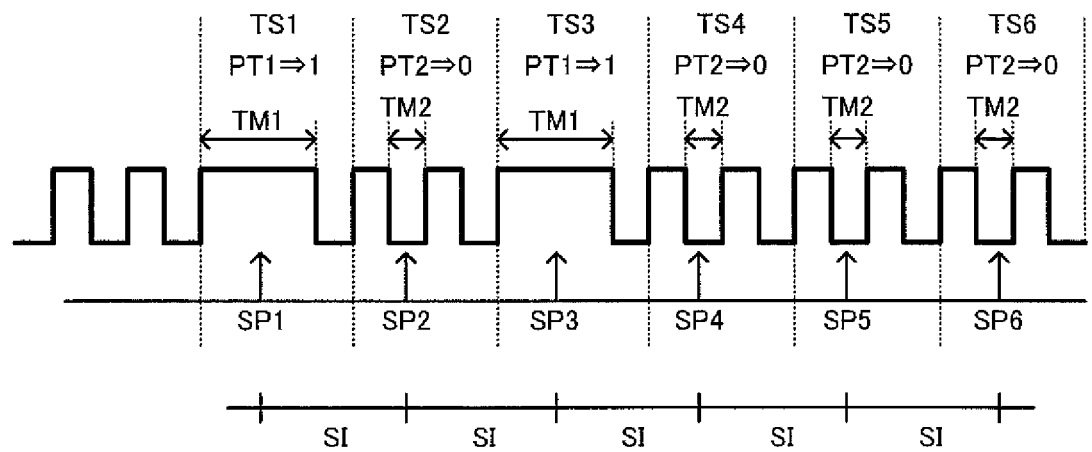
FIG. 18 is a diagram for describing the communication method of the present embodiment.

On the other hand, a detection operation and fetching processing for communication data are performed on the power transmitting side by a method shown in FIG. 18, for example. For example, the communication portion 30 (demodulation portion) performs sampling on the load modulation pattern from a first sampling point SP1 that is set in the period TM1 in the first load state in the first pattern PT1 at given sampling intervals SI and takes in communication data of a given number of bits.

For example, sampling points SP1, SP2, SP3, SP4, SP5, and SP6 in FIG. 18 are sampling points that are set at sampling intervals SI. The sampling interval SI is an interval that corresponds to the length of the load modulation pattern. That is, the sampling interval SI is an interval that corresponds to the length of each of the first and second patterns PT1 and PT2 that are load modulation patterns. For example, in FIGS. 17A and 17B, the length of each of the first and second patterns PT1 and PT2 is 512×T(=512/FCK), and therefore the length of the sampling interval SI is also 512×T.

In FIG. 18, the load modulation patterns in the periods TS1, TS2, TS3, TS4, TS5, and TS6 are respectively PT1, PT2, PT1, PT2, PT2, and PT2. Here, the periods TS1, TS2, TS3, TS4, TS5, and TS6 are periods that respectively correspond to the sampling points SP1, SP2, SP3, SP4, SP5, and SP6. Accordingly, in the case shown in FIG. 18, communication data (101000) having a number of bits=6, for example, is taken in by performing sampling on the load modulation pattern from the first sampling point SP1 at the sampling intervals SI.

Specifically, the communication portion 30 detects a pulse whose signal level is a high level, and performs bit synchronization in the case where the pulse width is less than a first range width (220×T to 511×T, for example). Then, in the case where the bit synchronization is achieved, the first sampling point SP1 is set at the center point of the pulse width, and signals are taken in at the sampling intervals SI (512×T, for example) from the first sampling point SP1. The logic level is determined to be a logic level "1" (first pattern PT1) if the level of the signal that is taken in is a high level, and the logic level is determined to be a logic level "0" (second pattern PT2) if the level of the signal that is taken in is a low level. In this way, in FIG. 18, communication data (101000) is taken in. In actuality, by taking in data in an amount of 15 bits after the bit synchronization (after data of 1 bit is taken in in SP1), communication data of an amount of 16 bits as a whole is taken in. In this 16 bit communication data, the first 1 bit (the bit with which bit synchronization is achieved) is always "1".

In the present embodiment, as described above, in the case where the width of the period TM1 in the first load state is less than the first range width (220×T to 511×T), the first sampling point SP1 is set within the period TM1 of the first load state, as shown in FIG. 18. That is, in the case where the width of the period TM1 in which the signal level is at a high level is less than the first range width, bit synchronization is performed, and the first sampling point SP1 is set at the center point, for example, of the period TM1. Then, sampling is performed at the sampling intervals SI from the set first sampling point SP1. Here, the first range width (220×T to 511×T) is a range width that is set corresponding to the period TM1 (384×T) in the first load state in the first pattern PT1.

That is, as described in FIG. 16, the width of the period TM1 changes due to noise or the like. A typical value of the width of the period TM1 in the first pattern PT1 is a width 128×3×T=384×T that corresponds to an amount of 3 bits (111). Accordingly, the first range width (220×T to 511×T) is set so as to include this 384×T. The period at a high level that is less than the first range width (220×T to 511×T) is determined to be the period TM1 in the first pattern PT1, and bit synchronization for setting the first sampling point SP1 is performed. In this way, even in the case where noise is superimposed on the signal, as shown in FIG. 16, an adequate first sampling point SP1 can be set by performing adequate bit synchronization.

After setting the first sampling point SP1, sampling is performed at the sampling intervals SI, and either the first or second patterns PT1 and PT2 is determined based on the signal level at each sampling point. That is, the communication portion 30 determines that the load modulation pattern at the second sampling point SP2 is the first pattern PT1 in the case where the load state is the first load state (in the case where the signal level is at a high level) at the second sampling point SP2 which is next to the first sampling point SP1. That is, the communication portion 30 determines that the logic level of the bit in the communication data is "1". On the other hand, the communication portion 30 determines that the load modulation pattern at the second sampling point SP2 is the second pattern PT2 in the case where the load state is the second load state (in the case where the signal level is in the low level) at the second sampling point SP2. That is, the communication portion 30 determines that the logic level of the bit in the communication data is "0". The same is applied to the sampling points thereafter.

For example, in FIG. 18, the load state at the sampling point SP2 is the second load state (low level), and therefore the load modulation pattern is determined to be the second pattern PT2, and the logic level is determined to be "0". Since the load state at the sampling point SP3 is the first load state (high level), the load modulation pattern is determined to be the first pattern PT1, and the logic level is determined to be "1". Since the load states at the sampling points SP4, SP5, and SP6 are the second load state (low level), the load modulation patterns are determined to be the second pattern PT2, and the logic levels are determined to be "0".

Note that, at each of the sampling points SP2 to SP6 in FIG. 18, the width of the load state period that includes the sampling point may be verified to be in a predetermined range width.

For example, in the case where, at the third sampling point SP2, the load state is the first load state (high level) and the width of the first load state period TM1 (high level pulse width) that includes the second sampling point SP2 is less than the first range width (220×T to 511×T), the load modulation pattern at the second sampling point SP2 is determined to be the first pattern PT1 (logic level "1").

On the other hand, in the case where, at the second sampling point SP2, the load state is the second load state (low level) and the width of the second load state period TM2 that includes the second sampling point SP2 is less than the second range width (80×T to 150×T, for example), the load modulation pattern at the second sampling point SP2 is determined to be the second pattern PT2 (logic level "0").

Here, the second range width (80×T to 150×T) is a range width that is set corresponding to the second load state period TM2 (128×T) in the second pattern PT2. Since the typical value of period TM2 is 128×T corresponding to 1 bit, the second range width (80×T to 150×T) is set so as to include the period 128×T.

In the present embodiment as described above, the logic level of the communication data is judged by determining the load modulation pattern. For example, in a known technique, a method is adopted in which the first load state in which the switching element SW in the load modulation portion 56 is turned on is judged to be the logic level "1", and the second load state in which the switching element SW is turned off is the logic level "0". However, in this known method, a communication data detection error due to noise or the like may occur, as described in FIG. 16.

In contrast, in the present embodiment, the logic level of each bit in the communication data is detected by determining whether the load modulation pattern is the first or second pattern PT1 or PT2, as shown in FIGS. 17A and 17B, for example. Accordingly, even in a situation in which there is a large amount of noise, as shown in FIG. 16, proper detection of the communication data is made possible. That is, the width of the first load state (high level) period TM1 is very different in the first and second patterns PT1 and PT2 in FIGS. 17A and 17B, and the logic level of each bit of the communication data is detected by identifying patterns as a result of identifying the difference of the period TM1 width in the present embodiment. For example, in the first bit synchronization in FIG. 18, in the case where the period TM1 width is less than the first range width (220×T to 511×T), the sampling point SP1 is set at the center point of the period TM1, and signals are taken in at the sampling points SP2, SP3, SP4, . . . , thereafter. Therefore, even in a case where the period TM1 width or the like at the sampling point SP1 changes due to noise, for example, proper detection of the communication data is made possible. Also, since the sampling points SP2, SP3, SP4, thereafter can be set by simple processing based on the sampling interval SI, there is an advantage in that the processing load in the detection operation of the communication data can be reduced.

Note that the communication method of the present embodiment is not limited to the method described in FIGS. 17A, 17B and 18, and the like, and various modifications can be implemented. For example, although the first pattern PT1 is associated with the logic level "1" and the second pattern PT2 is associated with the logic level "0" in FIGS. 17A and 17B, the association relationship may be reversed. Also, the first and second patterns PT1 and PT2 in FIGS. 17A and 17B are examples of the load modulation patterns, and the load modulation patterns of the present embodiment are not limited thereto and various modifications can be implemented. For example, although the first and second patterns PT1 and PT2 are set to have the same length in FIGS. 17A and 17B, they may be set to have different lengths. Also, in FIGS. 17A and 17B, although the first pattern PT1 of bit pattern (1110) and the second pattern PT2 of bit pattern (1010) are used, the first and second patterns PT1 and PT2 having different bit patterns may be adopted. For example, it is sufficient that the first and second patterns PT1 and PT2 are patterns in which at least the first load state period TM1 (or second load state period TM2) is different, and various patterns that are different from those shown in FIGS. 17A and 17B can be adopted.

An example of the communication data format used in the present embodiment is shown in FIGS. 19A and 19B.

In FIG. 19A, the communication data is constituted by 64 bits, and one packet is configured by these 64 bits. The data of the first set of 16 bits is 00 h. In the case where normal power transmission (or intermittent power transmission) is started on the power transmitting side by detecting the load modulation on the power receiving side, for example, a certain amount of time is required before the current detection circuit 32 or the like in the communication portion 30 operates and the communication data can be properly detected. Therefore, 00 h that is dummy (null) data is set to the first 16 bits. Various processing necessary for bit synchronization, for example, is performed on the power transmitting side in a communication period of the first 16 bits 00 h.

A data code and information on the rectified voltage (VCC) are set in the second set of 16 bits. The data code is a code for specifying data that is to be transmitted by the third set of 16 bits, as shown in FIG. 19B. The rectified voltage (VCC) is used as transmitting power setting information of the power transmitting device 10. Specifically, the power supply voltage control portion 14 variably controls the power supply voltage VDRV that is supplied to the power transmission drivers DR1 and DR2 based on the rectified voltage (VCC) information or the like, and thereby variably controls the transmitting power of the power transmission portion 12.

Information such as temperature, a battery voltage, a charge current, a status flag, number of cycles, or an IC number is set to the third set of 16 bits according to the setting designated by the data code. The temperature is a battery temperature or the like, for example. The battery voltage and the charge current are the voltage (such as VBAT) and the charge current of the battery 90, and are information representing the charge state. The status flag is information representing a status on the power receiving side such as a temperature error (high temperature abnormality, low temperature abnormality), a battery error (battery voltage less than or equal to 1.0 V), an over-voltage error, a timer error, or full charge (normal end), for example. The number of cycles (cycle times) is information representing the number of charging times. The IC number is a number for specifying a control device IC. CRC information is set in the fourth set of 16 bits. The CRC is information for CRC error check.

Note that, in the case where, in FIG. 4, landing of the electronic apparatus 510 is detected and VCC becomes larger than 6.0 V, communication data of null data (dummy data) in 1 packet (64 bits) is transmitted first in the load modulation in B5. The normal power transmission is started on the power transmitting side by detecting the communication data of null data.

Figure 20:
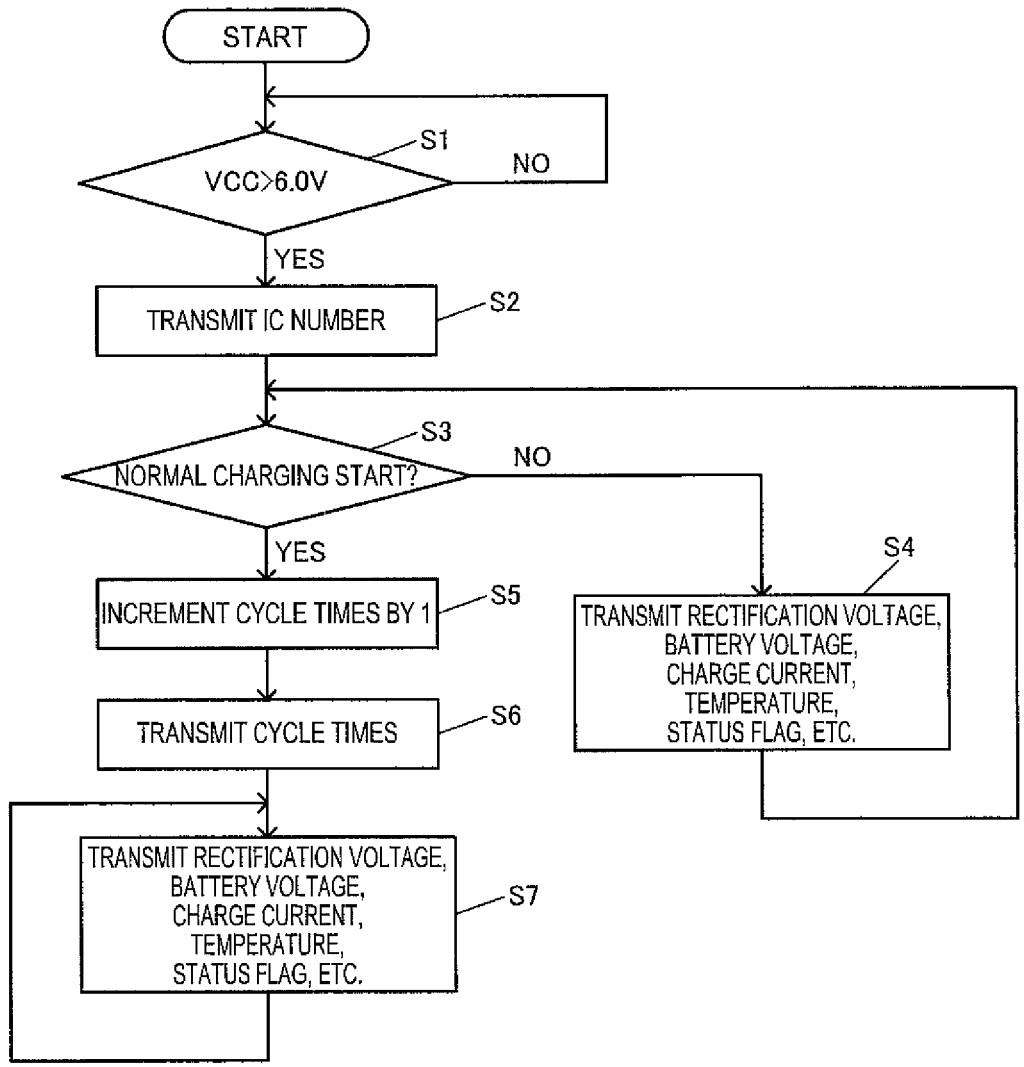
FIG. 20 is a flowchart for describing a detailed example of communication processing.

FIG. 20 is a flowchart for describing a detailed example of the communication processing of the present embodiment. First, the power receiving side (control portion 54) determines whether or not the rectification voltage VCC exceeds 6.0 V (step S1). When the power transmitting side transmits power, for example, the rectification voltage VCC increases by the power received by the power receiving side, and VCC increases above 6.0 V. The receiving side control device 50 operates with power supplied by the transmitting power on the power transmitting side, for example. Accordingly, in a period in which power is not transmitted from the power transmitting side, the control device 50 (excluding circuits in the discharging system) is not supplied with power, and is in a reset state, for example.

When the rectification voltage VCC increases above 6.0 V, the power receiving side, first, transmits the IC number to the power transmitting side by load modulation (step S2). For example, in FIGS. 19A and 19B, the IC number is designated by a data code, and the communication data including IC number information is transmitted.

In the case where normal charging cannot be started (step S3: NO) in cases such as a case of preliminary charging (charging of an over-discharged battery) when the battery voltage VBAT is less than 2.5 V and a case of a battery error when VBAT is less than 1.0 V, the power receiving side transmits the communication data including information such as the rectification voltage, the charge voltage, the charging current, the temperature, and the status flag by load modulation (step S4).

On the other hand, in the case where the normal charging can be started (step S3: YES), the number of cycles of charging is incremented by only one (step S5), and the number of cycles after increment is transmitted by load modulation (step S6). Then, in a period of the normal charging, transmission of the communication data including information such as the rectification voltage, the charge voltage, the charging current, the temperature, and the status flag is repeated (step S7). The power transmitting side can determine the charging status or the like on the power receiving side based on the information.

Note that, although an example of the communication method of the present embodiment is shown in the above, the communication method of the present embodiment is not limited thereto, and various modifications can be implemented. For example, the communication method of the present embodiment is not limited to the method in which the load modulation patterns are associated with the logic levels shown in FIGS. 17 and 18, and a method in which the first load state is associated with the logic level "1" and the second load state is associated with the logic level "0", for example, or the like may be adopted. Also, the format of the communication data and the communication processing are not limited to the method shown in FIGS. 18 and 19, and various modifications can be implemented.

6. Power Receiving Portion and Charging Portion

Figure 21:
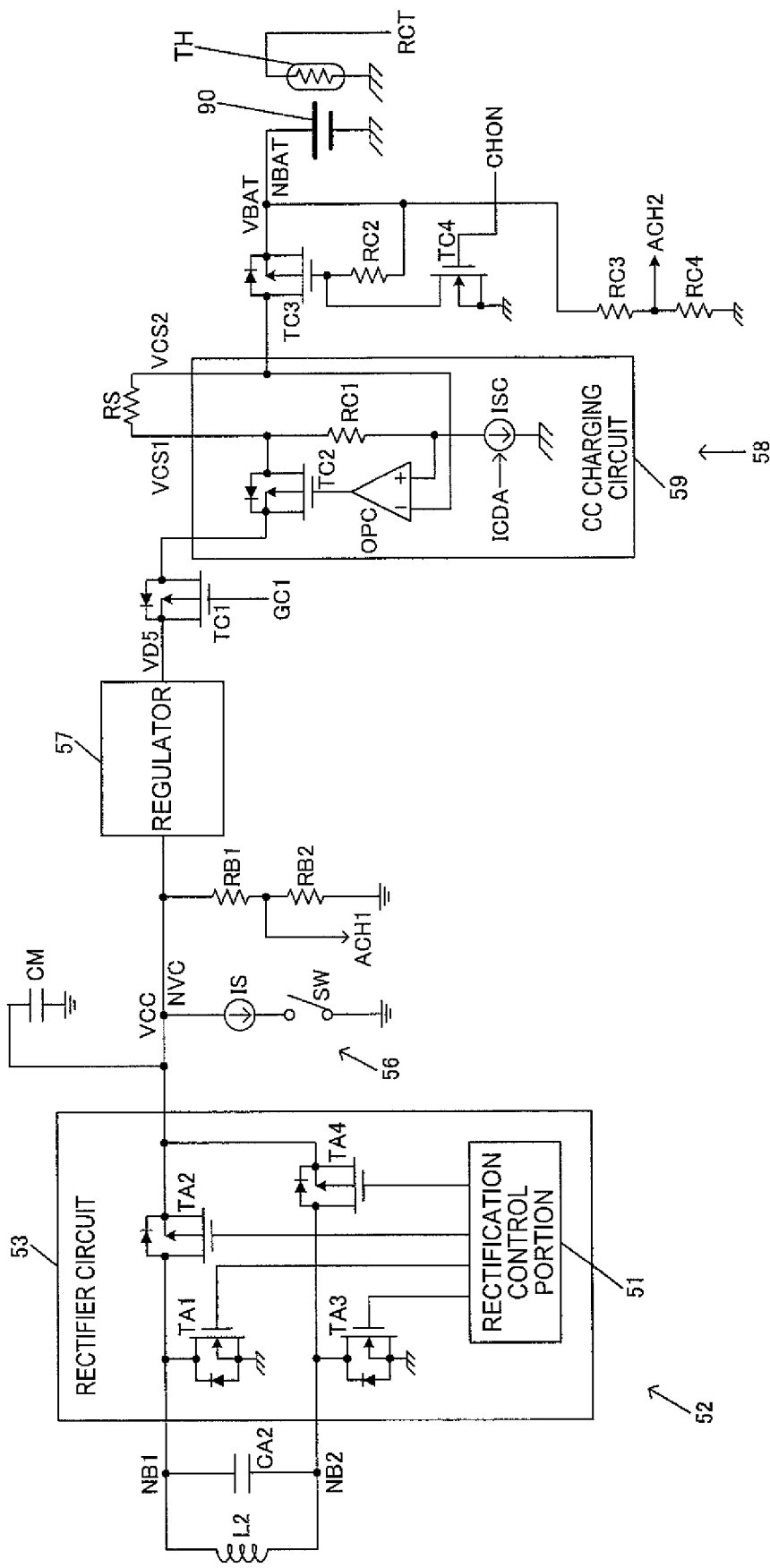
FIG. 21 illustrates detailed exemplary configurations of a power receiving portion and a charging portion.

A detailed exemplary configuration of the power receiving portion 52, the charging portion 58, and the like is shown in FIG. 21. The rectifier circuit 53 in the power receiving portion 52 includes transistors TA1, TA2, TA3, and TA4 for rectification and a rectification control portion 51 for controlling these transistors TA1 to TA4, as shown in FIG. 21.

The transistor TA1 is provided between a node NB1 which is one end of the secondary coil L2 and a GND (low potential side power supply voltage) node. The transistor TA2 is provided between the node NB1 and a node NVC of the rectified voltage VCC. The transistor TA3 is provided between a node NB2 which is the other end of the secondary coil L2 and the GND node. The transistor TA4 is provided between the node NB2 and the node NVC. A body diode is provided between a drain and a source of each of the transistors TA1 to TA4. The rectification control portion 51 performs rectification control for generating the rectified voltage VCC by outputting control signals to gates of the transistors TA1 to TA4.

Resistors RB1 and RB2 are provided in series between the node NVC of the rectified voltage VCC and the GND node. A voltage ACH1 that is generated by voltage-dividing the rectified voltage VCC with the resistors RB1 and RB2 is input to the A/D converter circuit 65 in FIG. 2, for example. Accordingly, monitoring of the rectified voltage VCC is made possible, and power control or the like based on the information of the rectified voltage VCC can be realized.

The regulator 57 performs voltage adjustment (regulation) on the rectified voltage VCC, and outputs a voltage VD5. The voltage VD5 is supplied to the CC charging circuit 59 in the charging portion 58 via a transistor TC1. The transistor TC1 is turned off with a control signal GC1 when an over-voltage of the battery voltage VBAT exceeding a predetermined voltage (4.25 V, for example) is detected. Note that circuits (circuits except for circuits in a discharging system such as the discharging portion 60) in the control device 50 operate with a voltage based on the voltage VD5 (voltage resulting from regulating VD5 or the like) as a power supply voltage.

The CC charging circuit 59 includes a transistor TC2, an operational amplifier OPC, a resistor RC1, and a current source ISC. The transistor TC2 is controlled based on the output signal of the operational amplifier OPC. A non-inverting input terminal of the operational amplifier OPC is connected to one end of the resistor RC1. The other end of the resistor RC1 is connected to one end of a sense resistor RS that is provided as a component external to the control device 50. The other end of the sense resistor RS is connected to an inverting input terminal of the operational amplifier OPC. The current source ISC is provided between the non-inverting input terminal of the operational amplifier OPC and the GND node. The current that flows in the current source ISC is controlled based on a signal ICDA.

By virtual short of the operational amplifier OPC, the transistor TC2 is controlled such that the voltage on the one end of the resistor RC1 (non-inverting input terminal voltage) is equal to the voltage VCS2 on the other end of the sense resistor RS (inverting input terminal voltage). The current that flows in the current source ISC by the control of the signal ICDA is represented as IDA, and the current that flows in the resistor RS is represented as IRS. Control is performed such that the equation IRS×RS=IDA×RC1 holds. That is, in the CC charging circuit 59, the current IRS (charge current) that flows in the sense resistor RS is controlled so as to be a constant current value that is set by the signal ICDA. In this way, CC (Constant-Current) charging is made possible.

A signal CHON is activated when charging is performed. Accordingly, the transistors TC3 and TC4 are turned on, and charging to the battery 90 starts. Also, reverse flow from the battery 90 is prevented by a resistor RC2 provided between a gate of the transistor TC3 and a node NBAT of the battery voltage VBAT or the like. Resistors RC3 and RC4 are provided in series between the node NBAT and the GND node, and a voltage ACH2 that is generated by voltage-dividing the battery voltage VBAT with the resistors RC3 and RC4 is input to the A/D converter circuit 65. Accordingly, monitoring of the battery voltage VBAT is made possible, and various types of control can be realized based on the charge state of the battery 90.

Also, a thermistor TH (temperature detection portion, in a broad sense) is provided in the vicinity of the battery 90. A voltage RCT on one end of the thermistor TH is input to the control device 50, and thereby measurement of the battery temperature is made possible.

Note that although this embodiment has been described above in detail, those skilled in the art will easily understand that various modifications are possible without substantially departing from the new matter and the effect of the invention. Accordingly, all those modifications are to be encompassed in the scope of the invention. For example, a term that is used at least once together with another term having a broader or the same meaning in the specification or the drawings may be replaced with the other term in any part of the specification or the drawings. All combinations of this embodiment and the modifications are also encompassed in the scope of the invention. Configurations, operations, or the like of the power transmitting side control device, the receiving side control device, the power transmitting device, the power receiving device are not limited to those described in this embodiment either, and various modifications can be implemented.

This application claims priority from Japanese Patent Application No. 2015-098045 filed in the Japanese Patent Office on May 13, 2015 the entire disclosure of which is hereby incorporated by reference in its entirely.

What is claimed is:

1. A control device of a power receiving device that receives power from a power transmitting device contactlessly, the control device comprising:
    a charging portion that charges a battery based on power in which a power receiving portion receives from the power transmitting device;
    a control portion that performs charging control;
    a nonvolatile memory,
    wherein the nonvolatile memory stores status information of the battery, and
    the control portion performs the charging control based on the status information stored in the nonvolatile memory;
    a load modulation portion that transmits communication data to the power transmitting device by load modulation,
    the load modulation portion comprising a current source and a switching element provided in series between a rectified voltage node and a ground node, the rectified voltage node including a rectified voltage that is output by the power receiving portion,
    wherein the switching element is turned on and off based on a control signal from the control portion, and a current of the current source that flows from the rectified voltage node to the ground node is caused to flow or cut off, thereby performing the load modulation; and
    a regulator that performs voltage adjustment on the rectified voltage, and outputs a power supply voltage,
    wherein the nonvolatile memory steps up the power supply voltage internally and operates with the stepped up power supply voltage,
    wherein the nonvolatile memory stores temperature abnormality detection information and number of charging times information representing the number of charging times of the battery as the status information,
    wherein when abnormal temperature is detected, the nonvolatile memory stores a battery voltage as the status information, and consumption of the battery is determined by comparing the battery voltage stored in the nonvolatile memory with a battery voltage at a time when charging starts,
    wherein the control portion:
        causes the number of charging times information in the nonvolatile memory to not be updated when the temperature abnormality detection information is stored in the nonvolatile memory, and
        causes the number of charging times information in the nonvolatile memory to be updated when the temperature abnormality detection information is not stored in the nonvolatile memory, and
    wherein even when the temperature abnormality detection information is stored in the nonvolatile memory, when the battery voltage has decreased from the battery voltage stored in the nonvolatile memory by a predetermined voltage, the control portion updates the number of charging times information in the nonvolatile memory.

2. The control device according to claim 1,
    wherein the load modulation portion, when abnormal temperature is detected, transmits the temperature abnormality detection information to the power transmitting device by the load modulation.

3. The control device according to claim 1, wherein when the status information is stored in the nonvolatile memory, the control portion, after having written the status information to a first address, writes the status information to a second address that is different from the first address after a given period has elapsed.

4. The control device according to claim 1, wherein the nonvolatile memory stores charging control information of the battery.

5. An electronic apparatus comprising the control device according to claim 1.

6. A contactless power transmission system comprising:
    a power receiving device; and
    a power transmitting device,
    wherein the power transmitting device transmits power to the power receiving device, and performs communication processing with the power receiving device that transmits communication data by load modulation, the power transmitting device comprising:
        a driver control circuit that controls a power transmission driver in a power transmission portion that transmits power to the power receiving device, the power transmission driver including a first inverter circuit and a second inverter circuit;
        a power transmitting coil,
    wherein the first inverter circuit is directly connected to and drives a first end of the primary transmitting coil, and the second inverter circuit is directly connected to and drives a second end of the primary transmitting coil;
a control portion that controls the driver control circuit; and
a clock generation circuit that generates a drive clock signal,
wherein the driver control circuit generates a first control signal having a frequency based on the drive clock signal and a second control signal from the control portion, and outputs the first control signal to the first inverter circuit and the second inverter circuit to control the power transmission driver,
wherein the power receiving device includes a nonvolatile memory that stores status information of a battery, charges the battery based on the power received from the power transmitting device and the status information stored in the nonvolatile memory, and transmits communication data to the power transmitting device by the load modulation,
wherein the power receiving device, when abnormal temperature is detected, stores temperature abnormality detection information in the nonvolatile memory as the status information, and transmits the temperature abnormality detection information to the power transmitting device by the load modulation,
wherein when abnormal temperature is detected, the nonvolatile memory stores a battery voltage as the status information, and consumption of the battery is determined by comparing the battery voltage stored in the nonvolatile memory with a battery voltage at a time when charging starts, and
wherein the power transmitting device, when the communication data including the temperature abnormality detection information is received from the power receiving device, suspends normal power transmission, and transmits power to the power receiving device by intermittent power transmission during a waiting period during which power is intermittently transmitted in given intervals, and after the waiting period has elapsed, resumes normal power transmission.

* * * * *